(12) United States Patent
Thotton Veettil et al.

(10) Patent No.: US 11,917,721 B2
(45) Date of Patent: *Feb. 27, 2024

(54) METHODS AND APPARATUS FOR DETERMINING AND USING ENCLOSURE STATE INFORMATION

(71) Applicant: Charter Communications Operating, LLC, St. Louis, MO (US)

(72) Inventors: Vinayak K. Thotton Veettil, Parker, CO (US); William K. Logan, Overland Park, KS (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,414

(22) Filed: Jan. 30, 2023

(65) Prior Publication Data

US 2023/0171589 A1 Jun. 1, 2023

Related U.S. Application Data

(63) Continuation of application No. 17/242,174, filed on Apr. 27, 2021, now Pat. No. 11,570,613.

(51) Int. Cl.
*H04W 8/22* (2009.01)
*H04W 4/029* (2018.01)
*H04W 4/02* (2018.01)
*H04L 65/75* (2022.01)

(52) U.S. Cl.
CPC ............. *H04W 8/22* (2013.01); *H04L 65/75* (2022.05); *H04W 4/027* (2013.01); *H04W 4/029* (2018.02)

(58) Field of Classification Search
CPC ........ H04W 8/22; H04W 4/029; H04W 4/027
See application file for complete search history.

(56) References Cited

U.S. PATENT DOCUMENTS

| | | | | |
|---|---|---|---|---|
| 2009/0009589 A1* | 1/2009 | Kim | ................. | H04N 7/142 348/14.08 |
| 2012/0252425 A1* | 10/2012 | Moeglein | ............. | H04L 67/52 455/418 |
| 2015/0163461 A1* | 6/2015 | Eustice | ................. | G06V 10/80 348/77 |

* cited by examiner

*Primary Examiner* — Barry W Taylor
(74) *Attorney, Agent, or Firm* — Straub & Straub; Michael P. Straub; Stephen T. Straub

(57) ABSTRACT

An enclosure state, e.g., enclosed or not enclosed, of a communications device is determined based upon one or more of: i) a selected set of environmental sensor measurements, performed by the communications device, ii) a corresponding set of expected outdoor environmental conditions, e.g., sourced from a weather server, iii) weighting factors corresponding to each of the environmental conditions, and/or iv) a threshold value. The communications device performs one or more actions based on the determined enclosure state, enclosed, e.g. indoors, or not enclosed, e.g. outdoors. Exemplary actions include controlling a transmitter or receiver setting, communicating the enclosure state determination to an emergency responder or controlling an application resident on the communications device based on the determined enclosure state. Various exemplary actions contribute to efficient use of communications device resources, e.g., battery power and air link resources and/or contribute to increasing efficiency and/or safety with regard to emergency responses.

20 Claims, 25 Drawing Sheets

| FIGURE 2A |
|---|
| FIGURE 2B |
| FIGURE 2C |

FIGURE 2

| FIGURE 3A |
|---|
| FIGURE 3B |

| TEMPERATURE | | | | | | | | | | | | |
|---|---|---|---|---|---|---|---|---|---|---|---|---|
| | LOCATION = PHOENIX | | | | | | | | | | | |
| 708 → | MONTH | JAN | FEB | MAR | APR | MAY | JUN | JUL | AUG | SEP | OCT | NOV | DEC |
| 710 → | WEIGHT | 2 | 2 | 2 | 3 | 4 | 5 | 9 | 9 | 9 | 4 | 2 | 2 |

704 →

| TEMPERATURE | | | | | | | | | | | | |
|---|---|---|---|---|---|---|---|---|---|---|---|---|
| | LOCATION = BUFFALO | | | | | | | | | | | |
| 712 → | MONTH | JAN | FEB | MAR | APR | MAY | JUN | JUL | AUG | SEP | OCT | NOV | DEC |
| 714 → | WEIGHT | 9 | 8 | 7 | 3 | 4 | 5 | 5 | 6 | 6 | 3 | 8 | 9 |

706 →

| TEMPERATURE | | | | | | | | | | | | |
|---|---|---|---|---|---|---|---|---|---|---|---|---|
| | LOCATION = SAN DIEGO | | | | | | | | | | | |
| 716 → | MONTH | JAN | FEB | MAR | APR | MAY | JUN | JUL | AUG | SEP | OCT | NOV | DEC |
| 718 → | WEIGHT | 2 | 1 | 1 | 1 | 1 | 2 | 2 | 3 | 3 | 1 | 1 | 2 |

FIGURE 8

| FIGURE 13A |
|---|
| FIGURE 13B |
| FIGURE 13C |

FIGURE 13

| FIGURE 14A |
|---|
| FIGURE 14B |
| FIGURE 14C |

FIGURE 14

METHODS AND APPARATUS FOR DETERMINING AND USING ENCLOSURE STATE INFORMATION

RELATED APPLICATIONS

The present application is a continuation of U.S. patent application Ser. No. 17/242,174, filed on Apr. 27, 2021, which published as US 2022-0345878 A1 on Oct. 27, 2022, said application and application publication being hereby expressly incorporated by reference in their entirety.

FIELD

The present invention relates to wireless communications systems, and more particularly, to methods and apparatus for determining and using enclosure state information corresponding to an end user wireless device.

BACKGROUND

A wireless communications device typically has a different set of needs and capabilities depending upon whether or not the device is indoors or outdoors. It is inefficient and troublesome for the user to have to manually change settings each time the device moves between an indoor and outdoor environment. In addition, in emergency situations it is beneficial for an emergency responder to have as much information as possible readily available, e.g., to plan for an/or implement the response in an efficient and safe manner.

Based on the above discussion it would be beneficial if a communications device's enclosure state could be determined in an automated manner and the state information made available for use and/or distribution.

SUMMARY

An end user wireless communications device, e.g. a user equipment (UE) device includes environmental measurement sensors and is capable of measuring and reporting various environmental parameters, e.g. temperature, wind speed, humidity, atmospheric pressure, luminosity, audio sound levels, etc. Measurements of environmental conditions, captured by the communications device, are used to make a determination, e.g., automatically, as to the enclosure state of the communications device, e.g. whether the communications device in indoors or outdoors. Whether the device is in motion is also detected and taken into consideration in some embodiments.

One or more actions are controlled, e.g., by a processor included in the device or external to the device making the measurements, based on the determined enclosure state and/or motion of a device, e.g., UE device such as a cell phone or other communications device.

A communications device, which may be indoors or outdoors, measures a selected set of environmental parameter conditions at a particular location. An enclosure state determination device, e.g., a processor included in the communications device or included in a server, determines, e.g. predicts, the enclosure state of the communications device based on the selected set of environmental parameter measurements, a corresponding set of expected outdoor environmental conditions, e.g., obtained from a weather server, and a corresponding set of weights. The contribution to the enclosure state determination of different environmental conditions can be, and sometimes are, weighted differently, e.g. based on location, time of year, time of day, and/or other conditions. Environmental conditions, which are expected to vary greatly between outdoors and indoors at a particular location, time of year and/or time of day, are weighted more heavily than environmental conditions, which are expected to vary in a relatively small amount between outdoors and indoors at the particular location, time of year and/or time of day, with regard to the enclosure determination.

In some embodiments, the enclosure state determination device determines an enclosure probability indicator value, sometimes referred to as a composite score, and compares the determined probability indicator value to a threshold to determine enclosure state, e.g., a generated composite score over the threshold indicates that the communications device is probably inside, while a composite score less than the threshold indicates that the communications device is probably outside. The communications device performs one or more actions based on the enclosure state determination. Exemplary actions include: i) changing one or more device control parameter setting within the communications device, e.g., changing a power control setting which affects battery drain rate, changing transmitter and/or receiver settings, ii) communicating the enclosure state determination to an emergency responder device and/or to an emergency system or iii) controlling an application being used by the communications device based on the determined enclosure state.

An exemplary method of controlling a communications device, e.g., a user equipment (UE) device, in accordance with various embodiments, comprises: measuring, at the communications device, one or more environmental conditions, said step of measuring one or more environmental conditions including measuring at least a first environmental condition to determine a first environmental measurement value; operating an enclosure state determination device to determine, based on at least the first environmental measurement value an enclosure state of the communications device; and performing, at the communications device, one or more actions based on the determined enclosure state, said one or more actions including at least one of: i) using the determined enclosure state to control one or more communications device transmit or receive settings; ii) communicating the determined enclosure state to an emergency responder; or iii) controlling an application used by the communications device.

While various features discussed in the summary are used in some embodiments it should be appreciated that not all features are required or necessary for all embodiments and the mention of features in the summary should in no way be interpreted as implying that the feature is necessary or critical for all embodiments.

Numerous aspects, features, and variations on the above described methods and apparatus are discussed in the detailed description which follows.

BRIEF DESCRIPTION OF THE FIGURES

FIG. 2 comprises the combination of FIG. 2A, FIG. 2B and FIG. 2C.

FIG. 3 comprises the combination of FIG. 3A and FIG. 3B.

FIG. 8 is a set of tables illustrating exemplary weight values corresponding to temperature measurements for different locations and different months of the year, said weight values to be used in determining an enclosure state (indoors or outdoors) of a user device in accordance with an exemplary embodiment.

FIG. 13 comprises the combination of FIG. 13A, FIG. 13B and FIG. 13C.

FIG. 14 comprises the combination of FIG. 14A, FIG. 14B and FIG. 14C.

DETAILED DESCRIPTION

Figure 1:
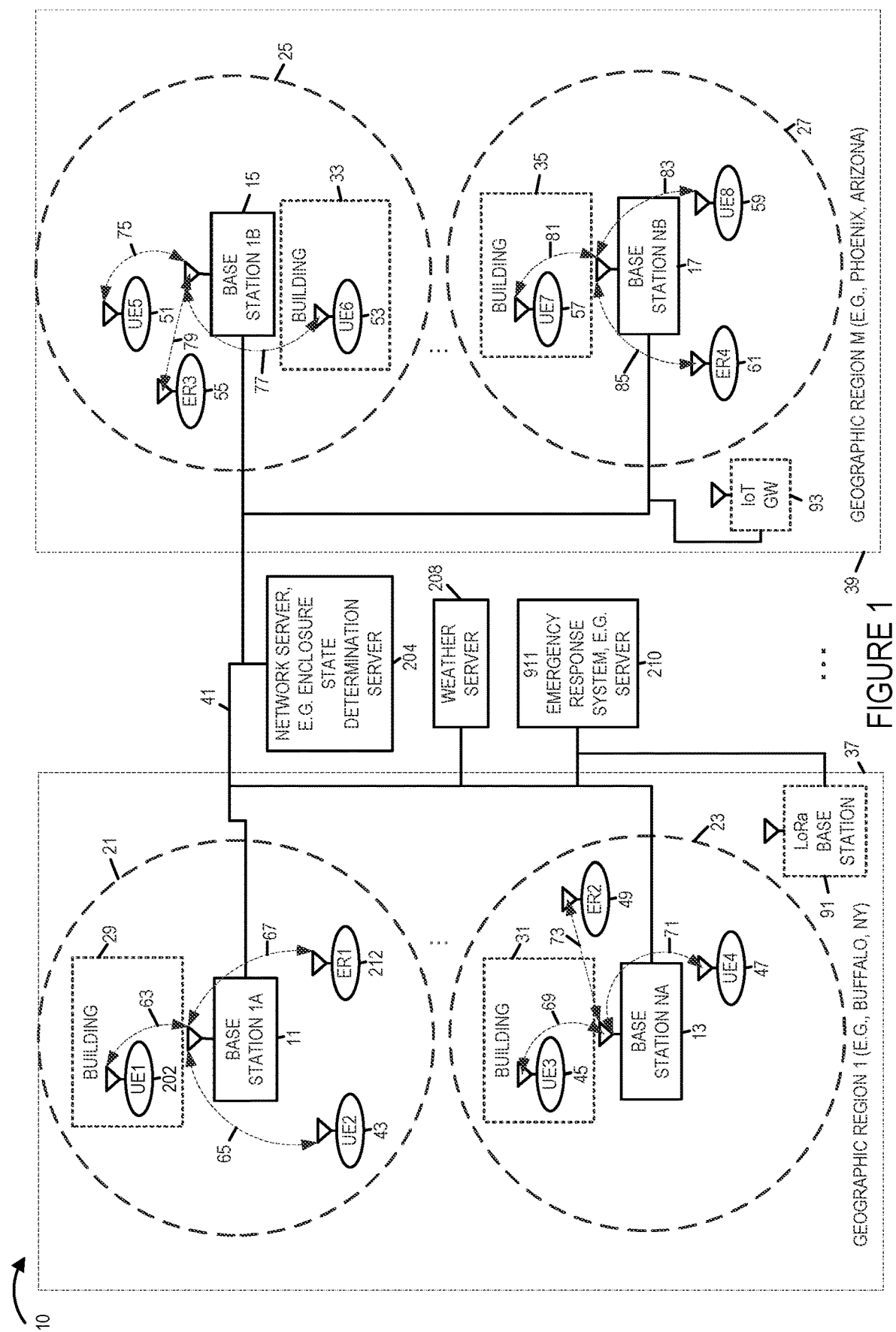
FIG. 1 is a drawing of an exemplary communications system in accordance with an exemplary embodiment.

FIG. 1 is a drawing of an exemplary communications system 10 in accordance with an exemplary embodiment. Exemplary communications system 10 includes a plurality of base stations (base station 1A 11, . . . , base station NA 13, base station 1B 15, . . . , base station NB 17), e.g. cellular base stations, with corresponding coverage areas (cell 21, . . . , cell 23, cell 25, . . . cell 27), respectively a network server 204, e.g., an enclosure state determination server, a weather server 208, and a 911 emergency response system 210, e.g. server, coupled together via a backhaul network 41. Base station 1A 11 and base station NA 13 area located in geographic region 1 37, e.g. a Buffalo New York area. Base station 1B 11 and base station NB 83 area located in geographic region M 39, e.g., a Phoenix Arizona area. Different weights with regard to an environmental parameter, e.g., temperature, to be considered with regard to a UE enclosure determination may be, and sometimes are, associated with different geographic regions.

In some embodiments, the communications system 10 includes additional alternative wireless access network devices, e.g., a Long Range Wide Area Network (LoRa WAN) base station 91 and an Internet-of Things (IoT) Gateway 93 which are also coupled to backhaul network 41. Exemplary communications system 10 further includes a plurality of end user wireless communications devices including environmental sensors (user equipment (UE) 1 202, UE 2 43, UE 3 45, UE 4 47, UE 5 51, UE 6 53, UE 7 57, UE 8 59), and a plurality of emergency responder wireless communications devices (ER 1 212, ER 2 49, ER 3 55, ER 4 61). Some of the UEs are shown to be currently located within abuilding while other UEs are shown to be currently located outdoors. UE 1 202, UE 3 45, UE 6 53 and UE 7 57 are shown to be currently located in building 29, building 31, building 33, and building 35, respectively. UE 2 43, UE 4 47, UE 5 51 and UE 8 59 are shown to be currently located outdoors. At least some of the UEs (UE 1 202, UE 2 43, UE 3 45, UE 4 47, UE 5 51, UE 6 53, UE 7 57, UE 8 59) are mobile devices which may move throughout the system and be indoors during some of the time and outdoors during other times.

Enclosure state (outdoors or indoors) of a UE may be, and sometimes is, determined, e.g., by network server 204 and/or by a UE including an enclosure state determination component included within a UE, based on environmental measurements of the UE, expected outdoor environmental conditions, e.g., from weather server 208, and weights associated with environmental parameters. Determined enclosure state (e.g., indoors or outdoors) and/or additional information, e.g., environmental measurement information, and/or additional determinations, e.g., (UE located in lit area indoors or in dark area indoors), may be, and sometimes is communicated to the emergency response system 210 and/or a particular emergency responder in the area of the UE, e.g., the emergency responder corresponding to communication device ER 1 212 for UE 1 202. Various actions can be, and sometimes are, taken, e.g., by the UE, by emergency response system 210 and/or by an emergency responder, in response to an enclosure state determination, e.g. to: assist in locating the user of the UE (e.g. initiate audio alarm or special signal (beacon) from UE device at an appropriate time), facilitate a rescue in a speedy in an efficient manner, minimize risk to the emergency responder (e.g., avoid entering a damaged structure when the user is outside), conserve battery power of the UE device, e.g., by changing device setting (TX/RX power levels, time intervals, protocol used, on/off times), etc.

Figure 2A:
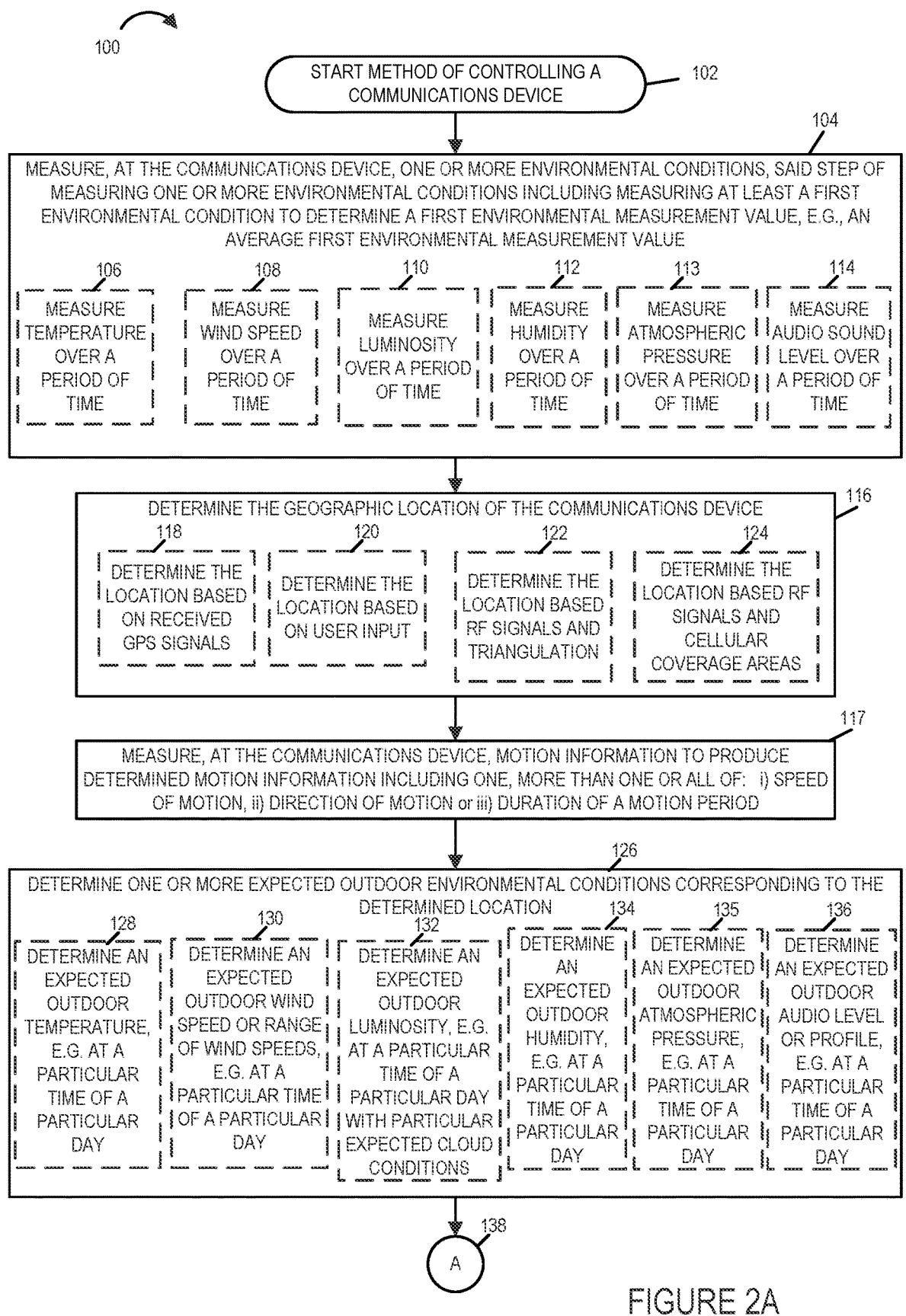
FIG. 2A is a first part of a flowchart of an exemplary method of controlling a communications device, e.g. a user equipment (UE) device, in accordance with an exemplary embodiment.
Figure 2B:
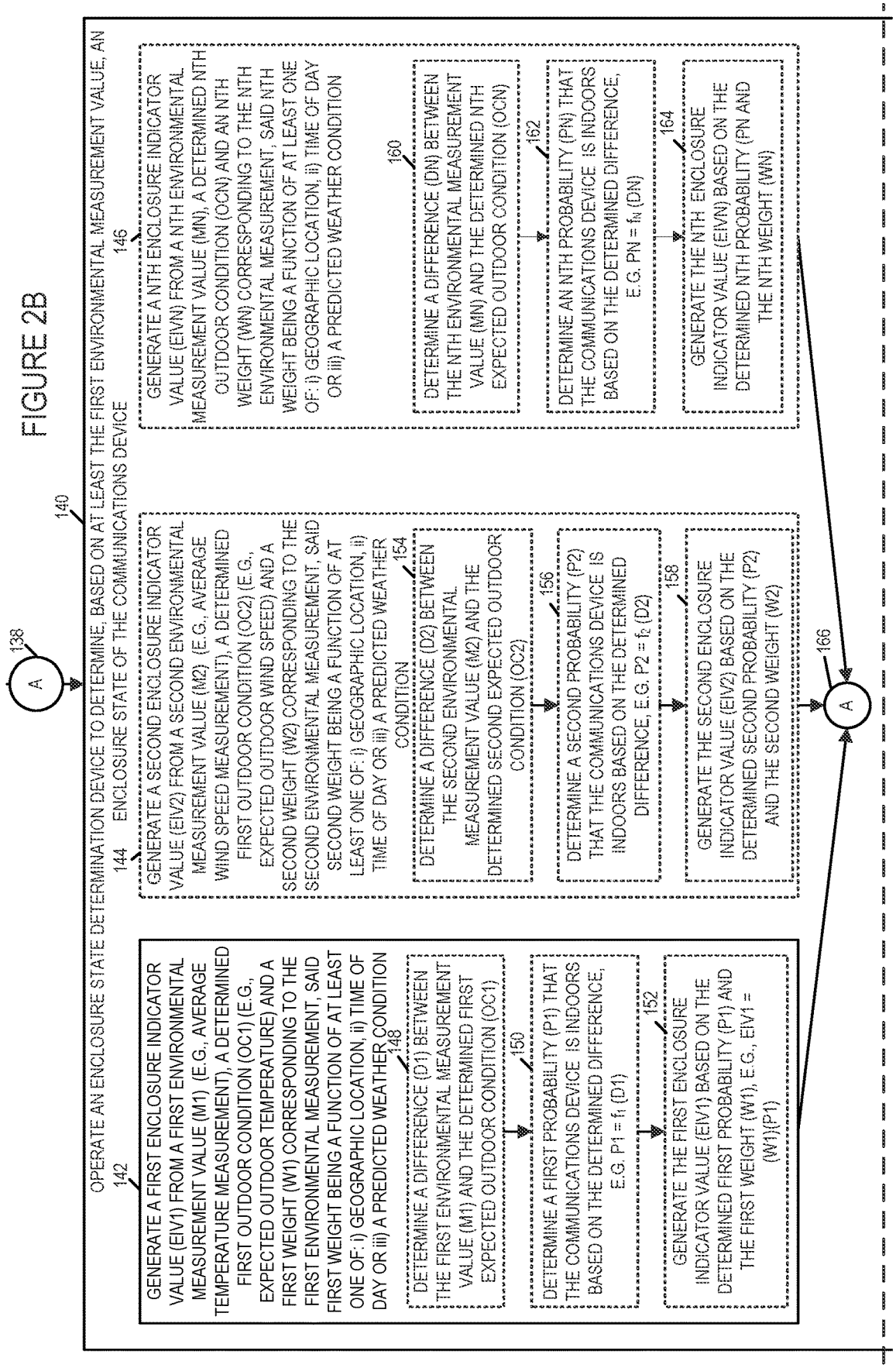
FIG. 2B is a second part of a flowchart of an exemplary method of controlling a communications device, e.g. a user equipment (UE) device, in accordance with an exemplary embodiment.
Figure 2C:
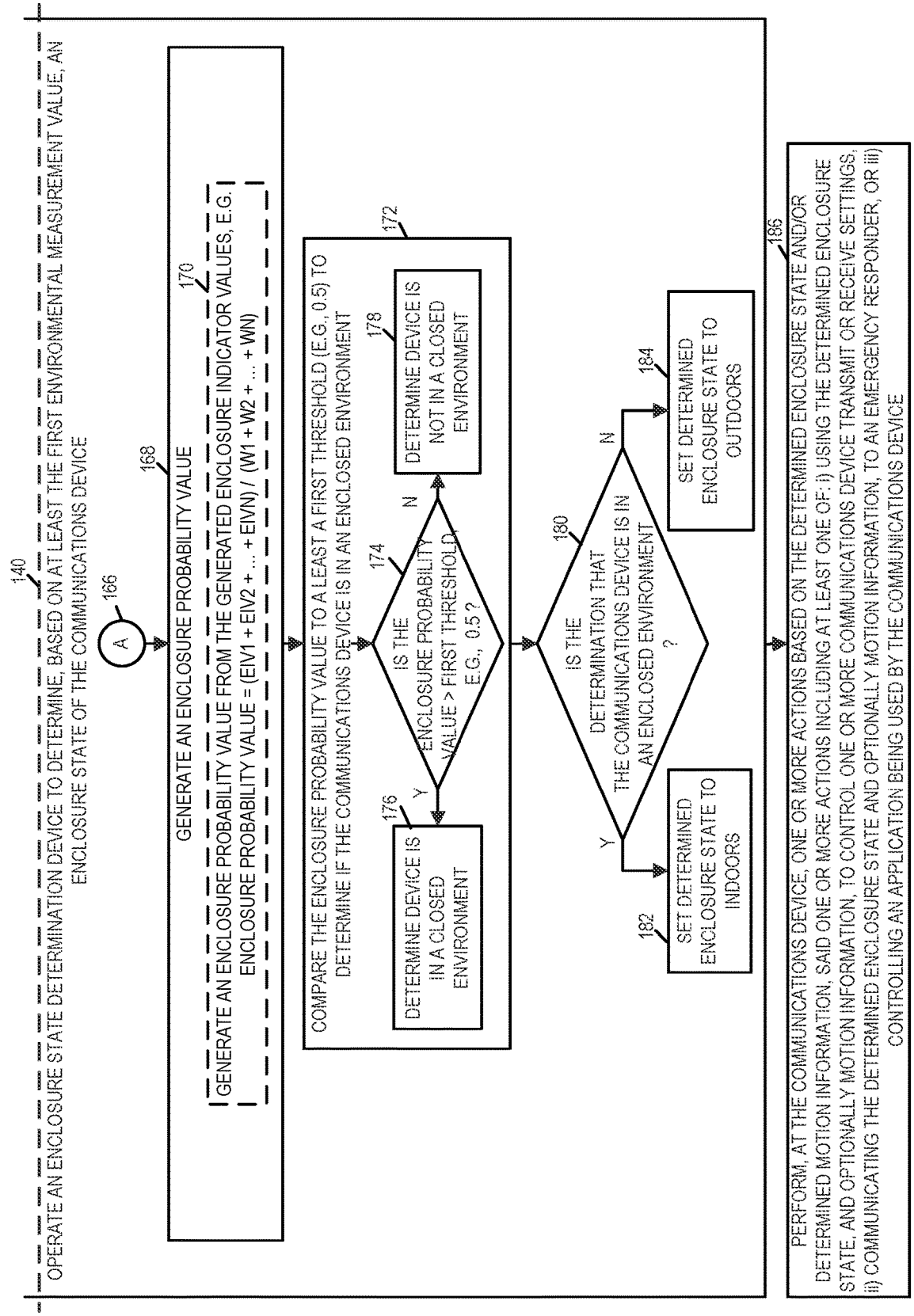
FIG. 2C is a third part of a flowchart of an exemplary method of controlling a communications device, e.g. a user equipment (UE) device, in accordance with an exemplary embodiment.

FIG. 2, comprising the combination of FIG. 2A, FIG. 2B and FIG. 2C, is a flowchart 100 of an exemplary method of controlling a communications device, e.g. a user equipment (UE) device, in accordance with an exemplary embodiment. The communications device implementing the method of flowchart 100 is, e.g., one of the UEs (UE 1 202, UE 2 43, UE 3 45, UE 4 47, UE 5 51, UE 6 53, UE 7 57, UE 8 59) of system 10 of FIG. 1, and/or a communications device 800, e.g., a UE, of FIG. 9.

Operation starts in step 104, in which the communications device, e.g., UE 1 202, measures one or more environmental conditions, said step of measuring one or more environmental conditions including measuring a first environmental condition to determine a first environmental measurement value, e.g., an average first environmental measurement value. In some embodiments, step 104 includes one or more or all of steps 106, 108, 110, 112, 113 and 114. In step 106, the communications device measure temperature over a period of time, e.g., obtaining an average temperature. In step 106, the communications device measures wind speed over a period of time, e.g., obtaining an average wind speed and/or or a maximum detected wind speed. In step 110 the communications device measures luminosity over a period of time, e.g., obtaining an average luminosity. In step 112 the communications device measures humidity over a period of time, e.g., obtaining an average humidity. In step 113 the communications device measures atmospheric pressure over a period of time, e.g., obtaining a average atmospheric pressure. In step 114 the communications device measures audio sound level over a period of time, e.g., obtaining an average audio level, a peak detected audio level, and/or one or more audio signatures identifying detected audio frequencies with corresponding levels, e.g., corresponding to objects of interest, e.g., automotive noise, road noise, jet airplane noise, bird noise, traffic noise, etc. Operation proceeds from step 104 to step 106.

In step 106 the communications device and/or a server determines the geographic location of the communications device. In various embodiments, step 116 includes one or more of all of steps 118, 120, 122, and 124. In step 118 the communications device or the server determines the location based on received GPS signals, e.g., the communications device includes an embedded GPS receiver, which receives GPS signals and determines the geographic location of the communications device. In step 120 the communications device or the server determines the location based on user input, e.g., the user of the communications device inputs the current location or user input, e.g., user activity, is detected to have been communicated via an access point at the fixed known location, e.g., a home or office WiFi AP, and the server associates the AP with a geographic location. In step 122 the communications device or the server determines the location of the communications device based on RF signals and triangulation, e.g., the communications devices detects and measures downlink broadcast signals from a plurality of base stations and uses triangulation to determine its location or a server receives reports of detected uplink reference signals from a plurality of base stations and performs triangulation to determine the communication device's current location. In step 124 the communications device or server determines the location of the communications device based on received RF signals, the known locations of a plurality of cellular base stations and the expected coverage range of each base station. Operation proceeds from step 116 to step 117 in which device motion is measured and motion information obtained, e.g., directly from the measurements or by processing the measurement of motion. A Global Position Sensor (GPS) device and/or gyroscope(s) and/or accelerometers can be used to provide device measurement and/or acceleration information depending on the embodiment. In at least some embodiments in step 117, which involves measuring motion information, produces determined motion information including one, more than one or all of: i) speed of motion, ii) direction of motion or iii) duration of a period of motion. A zero speed or rate of motion indicates a stationary device while a non-zero speed or rate of motion indicating a moving device. Thus, speed of motion indicates whether a device is a stationary or moving device. Operation proceeds from step 117 to step 126.

In step 126 the communications device, e.g., UE 1 202, or the server, e.g., server 204, determines one or more expected outdoor environmental conditions corresponding to the determined location. In some embodiments, step 126 includes sending a request for expected outdoor environmental condition information to a weather server, e.g., weather server 208, and receiving a response including expected outdoor environmental condition information. Step 126 includes one or more or all of step 128, 130, 132, 134, 135 and 136. In step 128 the communications device or the server determines an expected outdoor temperate, e.g., at a particular time of a particular day. In step 130 the communications device or the server determines an expected outdoor wind speed or rang of wind speeds, e.g., at a particular time of a particular day. In step 132 the communications device or the server determines an expected outdoor luminosity, e.g., at a particular time of a particular day with particular expected cloud conditions. In step 134 the communications device or the server determines an expected outdoor humidity, e.g., at a particular time or a particular day. In step 135 the communications device or the server determines an expected outdoor atmospheric pressure, e.g., at a particular time of a particular day. In step 136 the communications device or the server determines an expected outdoor audio level or audio profile, e.g., audio signature, at a particular time of a particular day. Operation proceeds from step 126, via connecting node A 138 to step 140.

In step 140 an enclosure state determination device, e.g., a processor in the communications device or a processor in the server, e.g., server 204, determines based on at least the first environmental measurement value, and enclosure state of the communications device. Step 140 include 142, step 168, step 172, step 180. step 182 and step 184. Step 140 may, and sometimes does, include one or more additional steps (step 144, . . . , step 146).

In step 142 the enclosure state determination device generates a first enclosure indicator value (EIV1) from a first environmental measurement value (M1), e.g., an average temperature measurement, a determined first expected outdoor condition (OC1), e.g. an expected outdoor temperature, and a first weight (W1) corresponding to the first environmental measurement, said first weight being a function of at least one of: i) geographic location, ii) time of day, or iii) a predicted weather condition. In some embodiments, step 142 includes steps 148, 150 and 152. In step 148 the enclosure state determination device determines a difference (D1)

between the first environmental measurement value (M1) and the determined first expected outdoor condition (OC1). Operation proceeds from step 148 to step 150. In step 150 the enclosure state determination device determines a first probability (P1) that the communications device is indoors based on the determined difference, e.g., P1 is a function of D1. Operation proceeds from step 150 to step 152. In step 152 the enclosure state determination device generates the first enclosure indicator value (EIV1) based on the determined first probability (P1) and the first weight (W1), e.g., EIV1=(W1) (P1).

In step 144 the enclosure state determination device generates a second enclosure indicator value (EIV2) from a second environmental measurement value (M2), e.g., an average wind speed measurement, a determined first expected second condition (OC2), e.g. an expected outdoor wind speed, and a second weight (W2) corresponding to the second environmental measurement, said second weight being a function of at least one of: i) geographic location, ii) time of day, or iii) a predicted weather condition. In some embodiments, step 144 includes steps 154, 156 and 158. In step 154 the enclosure state determination device determines a difference (D2) between the second environmental measurement value (M2) and the determined second expected outdoor condition (OC2). Operation proceeds from step 154 to step 156. In step 156 the enclosure state determination device determines a second probability (P2) that the communications device is indoors based on the determined difference, e.g., P2 is a function of D2. Operation proceeds from step 156 to step 158. In step 158 the enclosure state determination device generates the second enclosure indicator value (EIV2) based on the determined second probability (P2) and the second weight (W2), e.g., EIV2=(W2) (P2).

In step 146 the enclosure state determination device generates an Nth enclosure indicator value (EIVN) from an Nth environmental measurement value (MN), e.g., an average audio level measurement, a determined Nth expected second condition (OCN), e.g., an expected outdoor audio level, and an Nth weight (WN) corresponding to the Nth environmental measurement, said Nth weight being a function of at least one of: i) geographic location, ii) time of day, or iii) a predicted weather condition. In some embodiments, step 146 includes steps 160, 162 and 164. In step 160 the enclosure state determination device determines a difference (DN) between the Nth environmental measurement value (MN) and the determined Nth expected outdoor condition (OCN). Operation proceeds from step 162 to step 164. In step 160 the enclosure state determination device determines an Nth probability (PN) that the communications device is indoors based on the determined difference, e.g., PN is a function of DN. Operation proceeds from step 160 to step 162. In step 162 the enclosure state determination device generates the Nth enclosure indicator value (EIVN) based on the determined first probability (PN) and the Nth weight (WN), e.g., EIVN=(WN) (PN).

Operation proceeds from step 142, and in some embodiments from one or more of steps 144, . . . , 146, via connecting node A 166 to step 168. In step 168 the enclosure state determination device generates an enclosure probability value (sometimes referred to as a composite value), e.g., an overall enclosure state probability value. In some embodiments, step 168 includes step 170 in which the enclosure state determination device generates an enclosure probability value from the generated enclosure indicator values, e.g., enclosure probability value=(EIV1+EIV2+ . . . +EIVN)/(W1+W2+ . . . +WN). Operation proceeds from step 168 to step 170.

In step 170 the enclosure state determination device compares the enclosure probability value to at least a first threshold (e.g., 0.5) to determine if the communications device is in an enclosed environment. Step 172 includes steps 174, 176 and 178. In step 174 the enclosure state determination device compares the enclosure probability value to the threshold, e.g., 0.5. If the comparison indicates that the enclosure probability value is greater than the threshold, e.g., 0.5, then operation proceeds from step 174 to step 176, in which the enclosure state determination device determines the enclosure state to be indoors. If the comparison indicates that the enclosure probability value is not greater than the threshold, e.g., 0.5, then operation proceeds from step 174 to step 178, in which the enclosure state determination device determines the enclosure state to outdoors. Operation proceeds from step 140 to step 186.

In step 186 the communications device performs one or more actions based on the determined enclosure state and/or determined motion information, said one or more actions including at least one of: i) using the determined enclosure state to control one or more communications device transmit or receive settings (e.g., transmit power level, monitoring for signal intervals, which of a plurality of wireless interfaces are powered on or off at a given time, e.g., power off Bluetooth or other short range communications when outdoors); ii) communicating the determined enclosure state to an emergency responder (e.g., first responder in the case of a 911 emergency call so the responder knows whether the caller is insider or outside and possibly covered by building material to facilitate finding the caller); or iii) controlling an application being used by the communications device. In embodiments where the determined motion information is used in performing said one or more actions along with enclosure state information, step 186 includes performing, at the communications device, using determined motion information, along with the enclosure state information, to: i) control one or more communications device transmit or receive settings (e.g., periodicity or rate at which measurement of environmental conditions are performed and communicated to the enclosure state determination device, ii) communicating the motion information along with the determined enclosure state to an emergency responder (e.g., first responder in the case of a 911 emergency call so the responder knows whether the caller is insider or outside and possibly covered by building material to facilitate finding the caller); or iii) controlling an application being used by the communications device based on both the determined enclosure state and determined motion information. While enclosure state information is used in controlling or implementing actions in some embodiments determined motion information is used to control and/or implement one or more actions of the type described without making the action depend on enclosure state information in at least some but not necessarily all embodiments.

In some embodiments, controlling one or more communications device transmit or receive settings includes: changing the frequency of network searches in response to a determined change in enclosure state, said frequency of network searches being higher when enclosure state indicates enclosed (indoors) than when enclosure state indicated not enclosed (outdoors). In various embodiments, controlling one or more communications device transmit or receive settings includes: changing the streaming quality in response to a determined change in enclosure state, wherein streaming quality is set at a higher rate when enclosure state indicates enclosed (indoors) than when enclosure state indicates not enclosed (outdoors). In some embodiments, controlling one or more communications device transmit or receive settings includes: activating or de-activating one or more interfaces (e.g., short range interface such as WiFi interface, Bluetooth interface, Bluetooth Low Energy (BLE) interface, etc.) in response to a determined change in enclosure state, wherein one or more short range interfaces are active when the enclosure state indicates enclosed (indoors) and are de-activated when the enclosure state indicates not enclosed (outdoors). In various embodiments, controlling one or more communications device transmit or receive settings includes: activating or de-activating one or more interfaces (e.g., long range interfaces such as a Narrow Band Internet-of-Things (NBIoT) interface, a Long Range Wide Area Network (LoRa WAN) interface, a Low Power Long Range Wide Area Network (LPLoRa WAN) interface, etc.) in response to a determined change in enclosure state, wherein one or more long range interfaces are de-activated when the enclosure state indicates enclosed (indoors) and are activated when the enclosure state indicates not enclosed (outdoors).

In some embodiments, controlling an application being used by the communications device includes: switching maps displayed by an application (e.g., navigation application) between indoor maps (interior building maps, e.g. floorplan maps such as a museum floorplan map or a office building maps identifying individual offices within a building with particular companies renting office space or individuals in offices or cubicles) to outside maps (e.g. street maps) in response to a determined change in enclosure state. In various embodiments, controlling an application being used by the communications device includes: controlling a targeted marketing application based on determined enclosure state (displaying marketing advertisement corresponding to a store when the determined enclosure state indicates enclosed (e.g., in a store or in an enclosed mall) while refraining from displaying the marketing advertisement when the determined enclosure state indicates not enclosed (outdoors).

Figure 3A:
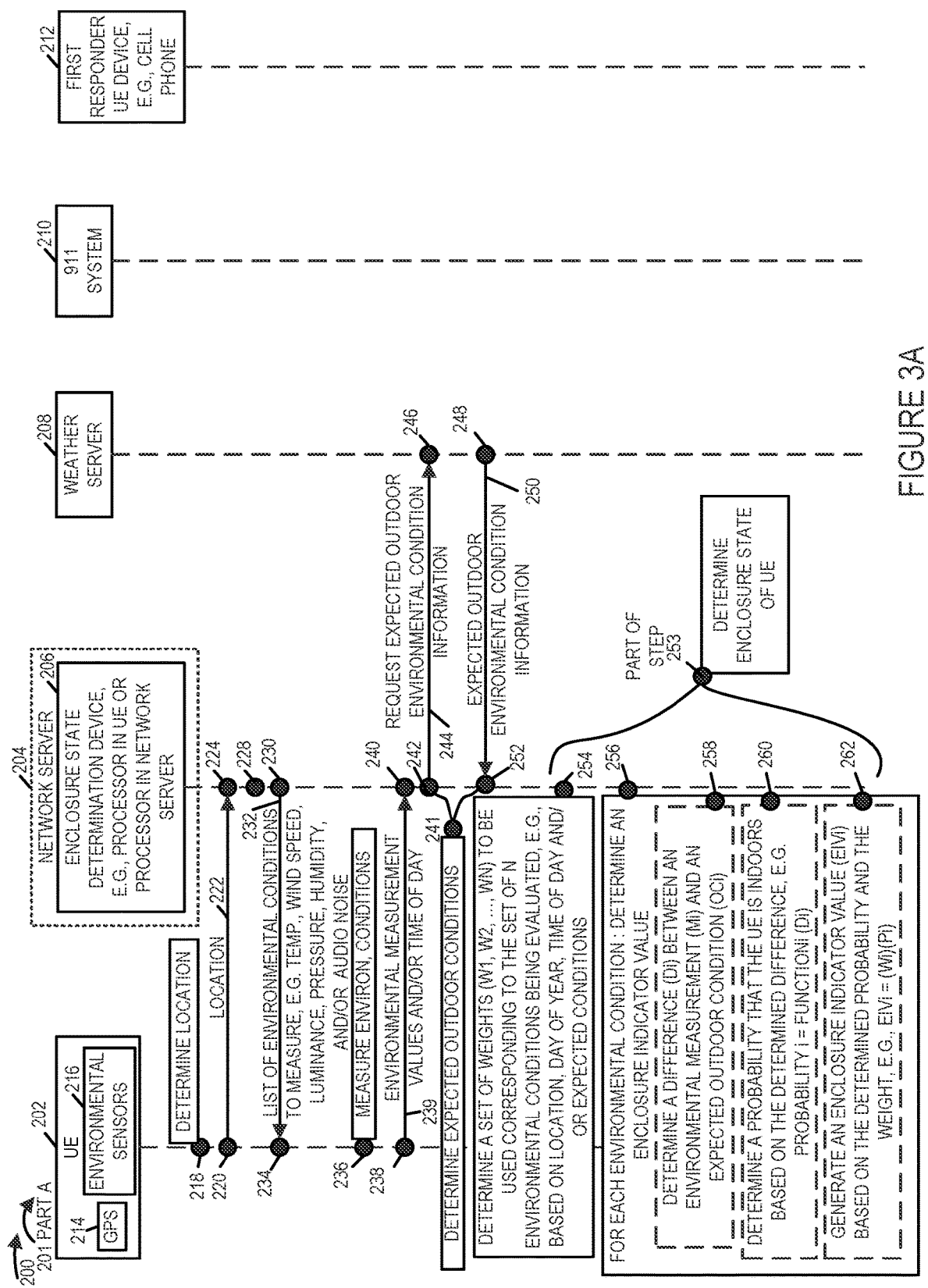
FIG. 3A is a first part of a drawing illustrating exemplary devices in an exemplary system, exemplary operations and exemplary signaling in accordance with an exemplary embodiment.
Figure 3B:
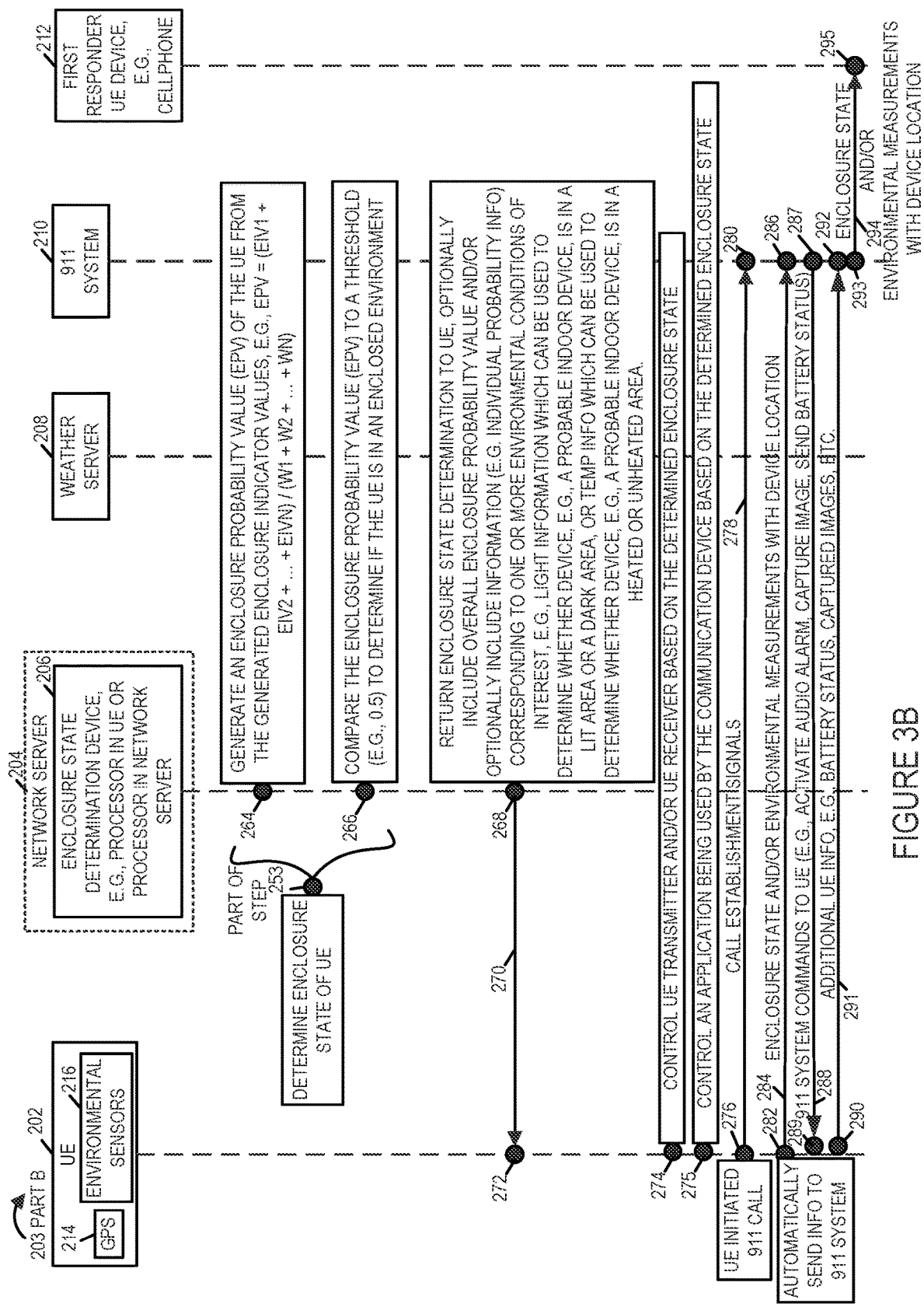
FIG. 3B is a second part of a drawing illustrating exemplary devices in an exemplary system, exemplary operations and exemplary signaling in accordance with an exemplary embodiment.

FIG. 3, comprising the combination of FIG. 3A and FIG. 3B, is a drawing 200, comprising the combination of Part A 201 and Part B 203 of an exemplary system and exemplary signaling in accordance with an exemplary embodiment. The exemplary system, e.g. system 10 of FIG. 1, includes a user equipment (UE) device 202, an enclosure state determination device 206, e.g. a processor in UE 202 or in a processor in a network server 204, a weather server 208, an emergency responder system 211, e.g., a 911 emergency system which may be a server, and a first responder UE device 212, e.g., a cellphone or other wireless communications device, of a first responder, e.g. police officer, fireman, emergency medical person, etc. In some embodiments, the system includes a network server 204, e.g., an enclosure state determination server or a server including enclosure state determination capabilities as one of its supported functions. In drawing 200 the enclosure state determination device is shown within network server 204; however, in some embodiments, the enclosure state determination device 206 is alternatively included as part of UE device 202.

UE device 202 includes a GPS device 214, e.g., an embedded GPS receiver, and environmental sensors, e.g., a temperature sensor, a wind speed sensor, a light sensor, e.g., a luminosity sensor, a humidity sensor, a atmospheric sensor, e.g. a barometer, and an audio sensor.

In step 218 the UE device determines its location, e.g., latitude and longitude, based on processed received signals detected by GPS receiver 214. In various embodiments, in step 218 the UE device further determines a time tag associated with the position fix, velocities, an altitude and/or quality information based on the received detected GPS signals. In some embodiments, in which GPS signal quality is not high enough to obtain a current GPS position fix, the GPS or UE estimates position based on the last accurate GPS position fix and/or using additional inputs, e.g., measurements from an embedded inertial measurement unit (IMU), e.g., an IMU on a chip.

In step 220 the UE generates and sends message 222 including UE location information, e.g., the geographic location of the UE, to network server 204. In some embodiments message 222 further includes altitude information and/or velocity information. In step 224 the network server 204 receives message 222, recovers the communicated information including the UE location, and sends the recovered information to the enclosure state determination device 206.

In step 228 the enclosure state determination device 206 determines a list of environmental conditions to be measured by UE device 202. In step 230 the network server 204 generates and sends a message 232 including a list of environmental conditions, temperature, wind speed, luminance, pressure, humidity, and/or audio noise, to measure to the UE 202, said message 232 requesting the UE 202 to measure and report back on a set of environmental conditions. In some embodiments, the request further includes information including the time interval of measurement and/or the format for reporting, e.g., report average values based on measurements over a 2 minute time interval. In some embodiments, different reporting format may be, and sometimes is used for different type of measurements. For example, temperature may be an average measurement over a time interval, while wind speed may be a peak detected value over the time interval. In step 234 the UE 202 receives message 232 and recovers the list of environmental conditions to measure. In step 236 the UE 202, using its set of environmental sensors 216 performs measurements, in accordance with the request, and generates a report. In step 238 the UE 202 sends messages 239 communicating the environmental measurement values and/or time of day information corresponding to the measurements. In step 240 the network server 204 receives messages 239, recovers the communicated information and forwards the recovered information to the enclosure state determination device 206.

In step 242, the enclosure state determination device 206 generates and sends, via a transmitter of network server 204, a request message 244, said request message requesting expected outdoor environmental condition information corresponding to the determined location of the UE 202, to weather server 208. In various embodiments, the request message 244 identifies a set of environmental information and a corresponding geographic location for which outdoor expected conditions are to be provided. In step 246 the weather server 208 receives request message 244, recovers the request, accesses a weather database and obtains a set of expected outdoor weather conditions. In step 248 the weather server 208 generates a response message 250, including a set of expected outdoor environmental condition information, and sends the generated message 250 to the enclosure state determination device 206 of the network server 204. In step 252 the network server 204 receives message 250, recovers the communicated expected outdoor environmental condition information and forwards the recovered information to the enclosure state determination device 206. Steps 242 and 252 are considered to be part of step 241, in which the network server 204 including enclosure state determination device 206 determines one or more expected outdoor environmental conditions corresponding to the determined location of the UE 202.

In step 254 the enclosure state determination device 206 determines a set of weights (W1, W2, . . . , WN) to be used corresponding to a set of N environmental conditions being evaluated, e.g. based on location, day of year, time of day, and/or expected conditions. In step 256 the enclosure state determination device 206 determines, for each environmental condition, an enclosure indicator value. In some embodiments step 256 includes, for each environmental condition, an iteration of steps 248, 260 and 262. In step 248 the enclosure state determination device 206 determines a difference (Di) between an environmental measurement and an expected outdoor condition (OCi). In step 250 the enclosure state determination device 206 determines a probability that the UE is indoors based on the determined difference, e.g., Probability i (Pi)=Function i (Di). In step 262 the enclosure state determination device 206 generates an enclosure indicator value (EIV i) based on the determined probability and the weight, e.g., EIV i=(Wi) (Pi).

In step 264 the enclosure state determination device 206 generate an enclosure probability value (EPV) of the UE 202 from the generated enclosure indicator values, e.g., EPV= (EIV1+EIV2+ . . . +EIV N),/(W1+W2+ . . . +WN), and where there are N different environmental conditions being evaluated. Operation proceeds from step 264 to step 266.

In step 266 the enclosure state determination device 206 compares the enclosure probability value (EPV) to a threshold, e.g., 0.5, to determine if the UE is in an enclosed environment. For example, if the enclosure probability value is greater than 0.5, the enclosure state determination device 206 determines that the UE 202 is in an enclosed environment, e.g., indoors; however, if the enclosure probability value is less than or equal to 0.5, the enclosure state determination device 206 determines that the UE 202 is not in an enclosed environment, e.g. is outdoors. Steps 254, 256, 258, 260, 262, 264 and 266 are considered to be part of step 253, in which the enclosure state determination device 206 determines, based on at least a first environmental measurement value, an enclosure state of the UE device.

Operation proceeds from step 266 to step 268. In step 268 the enclosure state determination device 202 returns an enclosure state determination to the UE 202, optionally including an overall enclosure probability value and/or optionally including information, e.g. individual probability information, corresponding to one or more environmental conditions of interest, e.g. light information which can be used to determine whether the UE, which is determined to be most likely indoors, is in a lit area or a dark area, or temperature information which can be used to determine whether the UE, which is determined to be most likely indoors, is in a heated or unheated area. In step 268 a transmitter of the network server 204 sends message 270 communicating the enclosure state determination and, optionally additional information used to further predict the environment, to the UE 202. In step 272 UE 202 receives message 270 recovers the enclosure state determination. Operation proceeds from step 272 to one or more or all of steps 274, 275, and 276.

In step 274, the UE 202, in response to the enclosure state determination of message 270, controls the UE's receiver and/or transmitter based on the determined enclosure state. For example, based on the determined enclosure state, the UE 202 controls one or more communications device transmit or receive settings, e.g., sets a transmit power level, sets monitoring intervals for signal reception, determines and sets which of a plurality of wireless interfaces are to be powered on and which of the plurality of wireless interfaces are to be powered off at a given time, e.g., power off Bluetooth or other short range communications when outdoors.

In some embodiments, controlling one or more of the UE's transmit or receive settings includes: changing the frequency of network searches in response to a determined change in enclosure state, said frequency of network searches being higher when enclosure state indicates enclosed (indoors) than when enclosure state indicated not enclosed (outdoors). In various embodiments, controlling one or more of the UE's transmit or receive settings includes: changing the streaming quality in response to a determined change in enclosure state, wherein streaming quality is set at a higher rate when enclosure state indicates enclosed (indoors) than when enclosure state indicates not enclosed (outdoors). In some embodiments, controlling one or more of the UE's transmit or receive settings includes: activating or de-activating one or more interfaces (e.g., short range interface such as WiFi interface, Bluetooth interface, Bluetooth Low Energy (BLE) interface, etc.) in response to a determined change in enclosure state, wherein one or more short range interfaces are active when the enclosure state indicates enclosed (indoors) and are de-activated when the enclosure state indicates not enclosed (outdoors). In various embodiments, controlling one or more of the UE's transmit or receive settings includes: activating or de-activating one or more interfaces (e.g., long range interfaces such as a Narrow Band Internet-of-Things (NBIoT) interface, a Long Range Wide Area Network (LoRa WAN) interface, a Low Power Long Range Wide Area Network (LPLoRa WAN) interface, etc.) in response to a determined change in enclosure state, wherein one or more long range interfaces are de-activated when the enclosure state indicates enclosed (indoors) and are activated when the enclosure state indicates not enclosed (outdoors).

In step 275 the UE 202 controls an application being used by the UE 202 based on the determined enclosure state. In some embodiments, controlling an application being used by the UE 202 includes: switching maps displayed by an application (e.g., navigation application) between indoor maps (interior building maps, e.g. floorplan maps such as a museum floorplan map or a office building maps identifying individual offices within a building with particular companies renting office space or individuals in offices or cubicles) to outside maps (e.g. street maps) in response to a determined change in enclosure state. In various embodiments, controlling an application being used by the UE 202 includes: controlling a targeted marketing application based on determined enclosure state (displaying marketing advertisement corresponding to a store when the determined enclosure state indicates enclosed (e.g., in a store or in an enclosed mall) while refraining from displaying the marketing advertisement when the determined enclosure state indicates not enclosed (outdoors).

In step 276, the UE 202 to initiate a call to 911. Thus, in step 276, the UE 202 generates and transmits call establishment signals 278 to 911 system 210. In step 280 the 911 system 210 receives call establishment signals 280 and, in response a communications link is established between the UE 202 and the 911 system 210. In step 282 the UE 202 sends, e.g., automatically sends, message 284, including enclosure state and/or environmental measurements with UE device location, to the 911 system 210.

In some embodiments, the 911 system 210 can request and receive additional information from the UE, e.g., UE device battery status information, UE device historical location information, UE device contact information, etc. In some embodiments, the 911 system can command the UE device 202 to execute instructions, e.g., broadcast and audible sound at a particular frequency at a particular time, activate its camera, capture images and send the images, etc. In step 287 the 911 system generates and sends messages 288 including requests and/or commands to the UE 202, e.g., requesting reporting of UE status information such as battery status information, GPS based historical route information, etc. and/or commanding the UE to activate an audio alarm or a flashing light, e.g., at a predetermined time, and/or commanding the UE to capture and send back images. In step 289 the UE 202 receives the 911 system commands and/or requests, and in response performs the requested operations, e.g., activating an audio alarm or capturing an image. In step 290, the UE 202 generates and sends message(s) 291 including additional UE information, e.g., battery status, captured images, etc., to the 911 system. In step 292 the 911 system receives the message(s) 291 and recovers the communicated additional UE information.

In step 293 the 911 system 210, generates and sends message(s) 294 to first responder UE device 212, said message(s) 294 including enclosure state and/or environmental measurement with device location. In some embodiments, messages(s) 294 including enclosure state and/or environmental measurement(s) with device location are send from the UE 202 to the first responder UE device 212, e.g., without having to traverse the 911 system 210, e.g., UE 202 establishes a communications session with first responder UE device 212. In some embodiments, the messages 294 includes additional UE information, e.g., an indication of whether or not the UE is in a lit or dark area, UE device battery information or an indication as to the amount of time when the UE battery will expire, captured images from the UE, a prior position fix of the UE when a current position fix of the UE is not available, etc. In step 295 the first responder UE device 212 receives message 294 and recovers the communicated information, which is presented to the first responder to assist in a rapid response. For example, the first responder in the case of a 911 emergency call, is made aware if the cell phone owner is insider or outside and possibly covered by building material to facilitate finding the caller.

In some embodiments, a 911 system device 210 and/or a first responder UE device 212 can, and sometimes does, contact UE device 202, e.g. under emergency conditions, and are able to retrieve information including an enclosure state determination from UE device 202, without input or invention from the user of UE device 202, e.g. the user or UE device 202 may be injured or unconscious and unable to initiate an emergency call, unable to respond to a call, or unable to answer a call, and the first responder may be trying to locate the user of UE device 202, e.g. at an emergency or disaster site.

Figure 4:
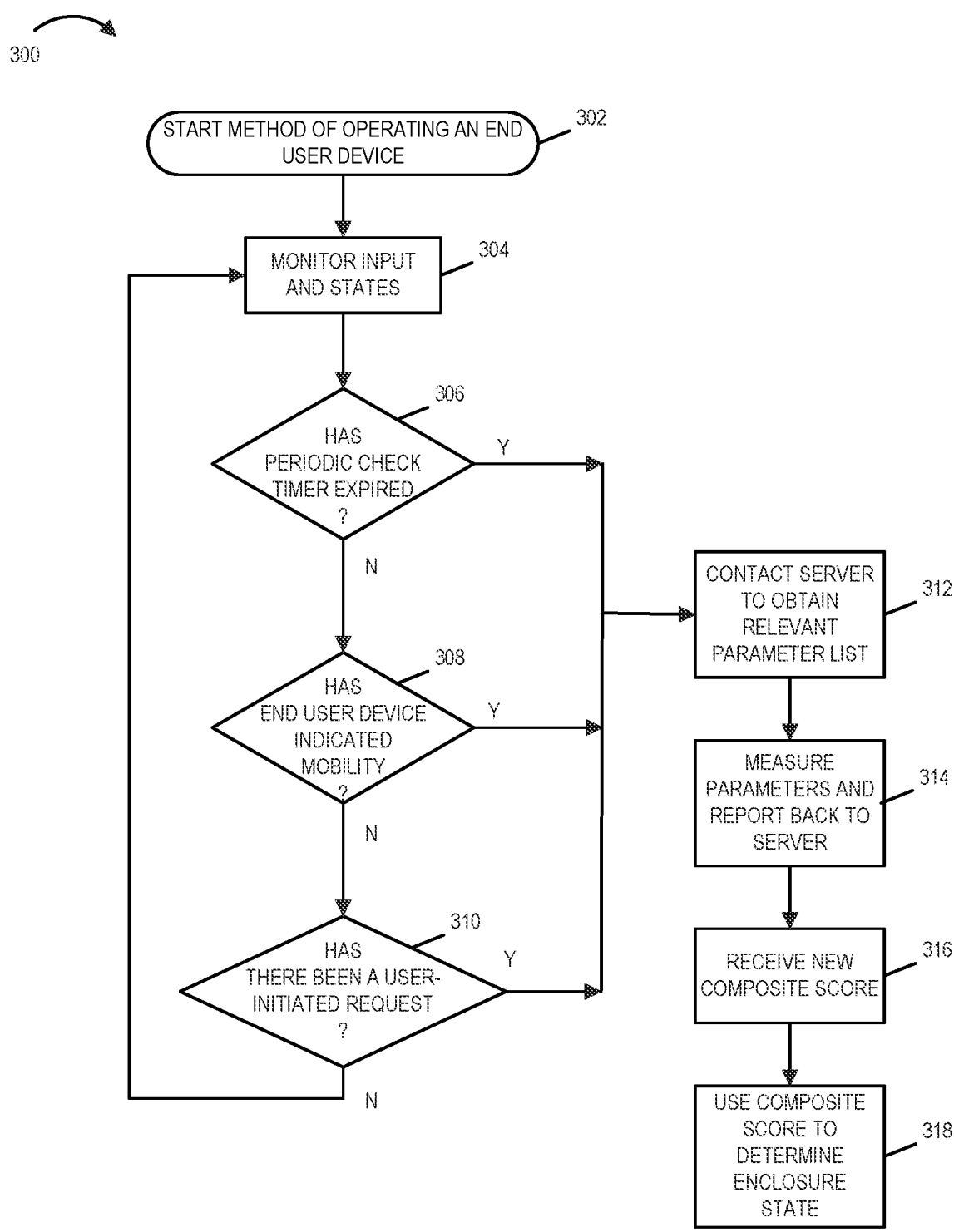
FIG. 4 is a flowchart of an exemplary method of operating an end user device in accordance with an exemplary embodiment.

FIG. 4 is a flowchart 300 of an exemplary method of operating an end user device in accordance with an exemplary embodiment. Operation of the exemplary method starts in step 302 in which the end user device is powered on and initialized. Operation proceeds from step 302 to step 304. In step 304 the end user device monitors input and states. Operation proceeds from step 304 to step 306. In step 306 the end user device determines if a period if a periodic check timer, which is running has expired. If the determination of step 306 is that the periodic check timer has expired, then operation proceeds from step 306 to step 312. However, if the determination of step 306 is that the periodic check timer has not expired, then operation proceeds from step 306 to step 308.

In step 308 the end user device determines if the end user device has indicated mobility, e.g. its GPS output has indicated a change in location above a predetermined threshold or its GPS or IMU has indicated a velocity above a predetermined threshold resulting in a calculated change in position above a predetermined threshold. If the determination of step 308 is that the end user device has indicated mobility, then operation proceeds from step 308 to step 312. However, if the determination of step 308 is that the end user device has not indicated mobility, e.g., the device is stationary or substantially stationary, then operation proceeds from step 308 to step 310.

In step 310 the end user device determines if there has been a user-initiated request. If the determination is that there has been a user initiated request, then operation proceeds from step 310 to step 312; otherwise, operation proceeds from step 310 to step 304 for additional monitoring.

Returning to step 312, in step 312 the end user device contacts a server to obtain a relevant parameter list, e.g., a list of set of environmental parameters (e.g., one or more or all of temperature, wind speed humidity, atmospheric pressure, luminosity, sound level) to measure. At different locations different parameters may be relevant. At different months and/or days and/or times of day at a particular location different parameters may be relevant. Also, different end user devices may have different device measurement capabilities, e.g., based on which set of environmental sensors has been included in the end user device. Parameters which are most relevant are parameters which are expected to indicate a large difference between when a measurement is indoors as compared to when a measurement is outdoors at the particular location, particular date and particular time of the measurement and which are measurable by the capabilities of the end user device. Thus, a list of relevant parameters is sent from the server to the end user device which receives the list. Operation proceeds from step 312 to step 314.

In step 314 the end user device measures parameters, e.g., measures the environmental parameters indicated on the relevant parameter list, e.g., obtaining a set of measurements, e.g., average measurements over a predetermined time interval, generates a report including the measurements and/or results based on the measurements, and sends the report to the server. The server generates a new composite score (indicative of enclosure state) based on the received reported measurements from the end user device, expected environmental outdoor conditions at the location and weights, and sends the composite score to end user device.

Operation proceeds from step 314 to step 316. In step 316 the end user device receives the new composite score. Operation proceeds from step 316 to step 318. In step 318 the end user device uses the composite score to determine enclosure state. For example, the end user device compares the received new composite score to a predetermined threshold, and if the composite score is above the threshold the end user device determines that the enclosure state is indoors; however, if the composite score if below the threshold, the end user device determines that the end user device enclosure state is outdoors.

Figure 5:
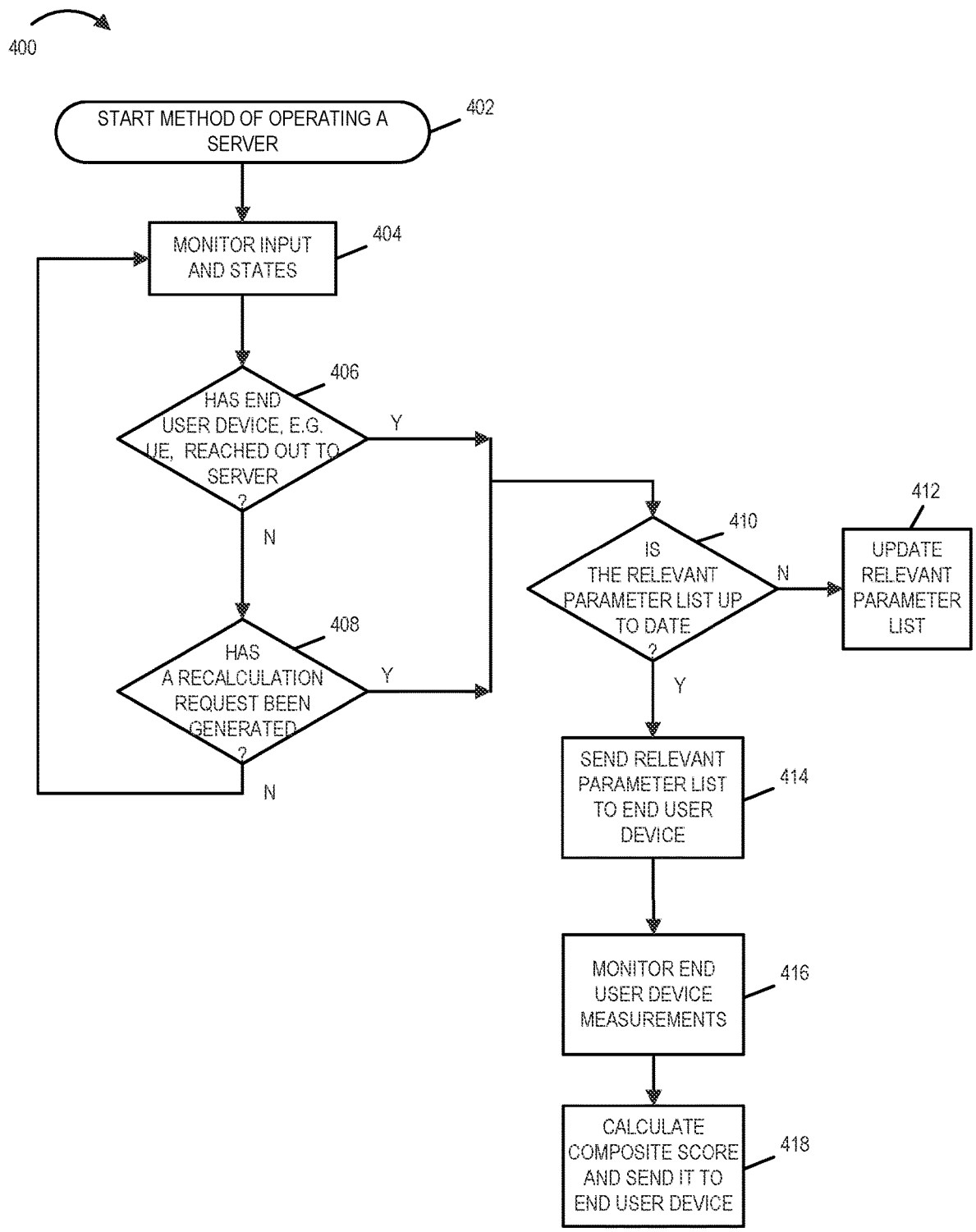
FIG. 5 is a flowchart of an exemplary method of operating a server in accordance with an exemplary embodiment.

FIG. 5 is a flowchart 400 of an exemplary method of operating a server in accordance with an exemplary embodiment. Operation of the exemplary method starts in step 402 in which the server is powered on and initialized. Operation proceeds from step 402 to step 404. In step 404 the server monitors input and states. Operation proceeds from step 404 to step 406.

In step 406, the server determines whether or not the end user device, e.g., UE, has reached out to the server, e.g., has the server received a message from the end user device requesting to obtain a relevant parameter list, said request including end user device location information. If the determination of step 406 is that the end user device has reached out to the server, then operation proceeds from step 406 to step 410. However, if the determination of step 406 is that the end user device has not reached out to the server, then operation proceeds from step 406 to step 408.

In step 408, the server determines if a recalculation request has been generated. If the determination of step 408 is that a recalculation request has been generated then operation proceeds from step 408 to step 410; otherwise, operation proceeds from step 408 to step 404 for additional monitoring.

Returning to step 410, in step 410 the server determines whether or not the relevant parameter list, e.g., for the end user device corresponding to its location, is up to date. If the determination is that the relevant parameter list is not up to date, then operation proceeds from step 410 to step 412, in which the server updates the relevant parameter list. However, if the determination is that the relevant parameter list is up to date, then operation proceeds from step 410 to step 414.

In step 414 the server sends the relevant parameter list to the end user device. Operation proceeds from step 414 to step 416. In step 416 the server monitors for, receives and recovers end user device measurements corresponding to the previously communications relevant parameter list. Operation proceeds from step 416 to step 418.

In step 418 the server calculates a composite score, e.g., based on the received user device measurements, expected outdoor environmental conditions at the location of the end user device, and a set of weights corresponding to the relevant parameter list, and sends the generated composite score to the end user device. The composite score is indicative of enclosure state.

Figure 6:
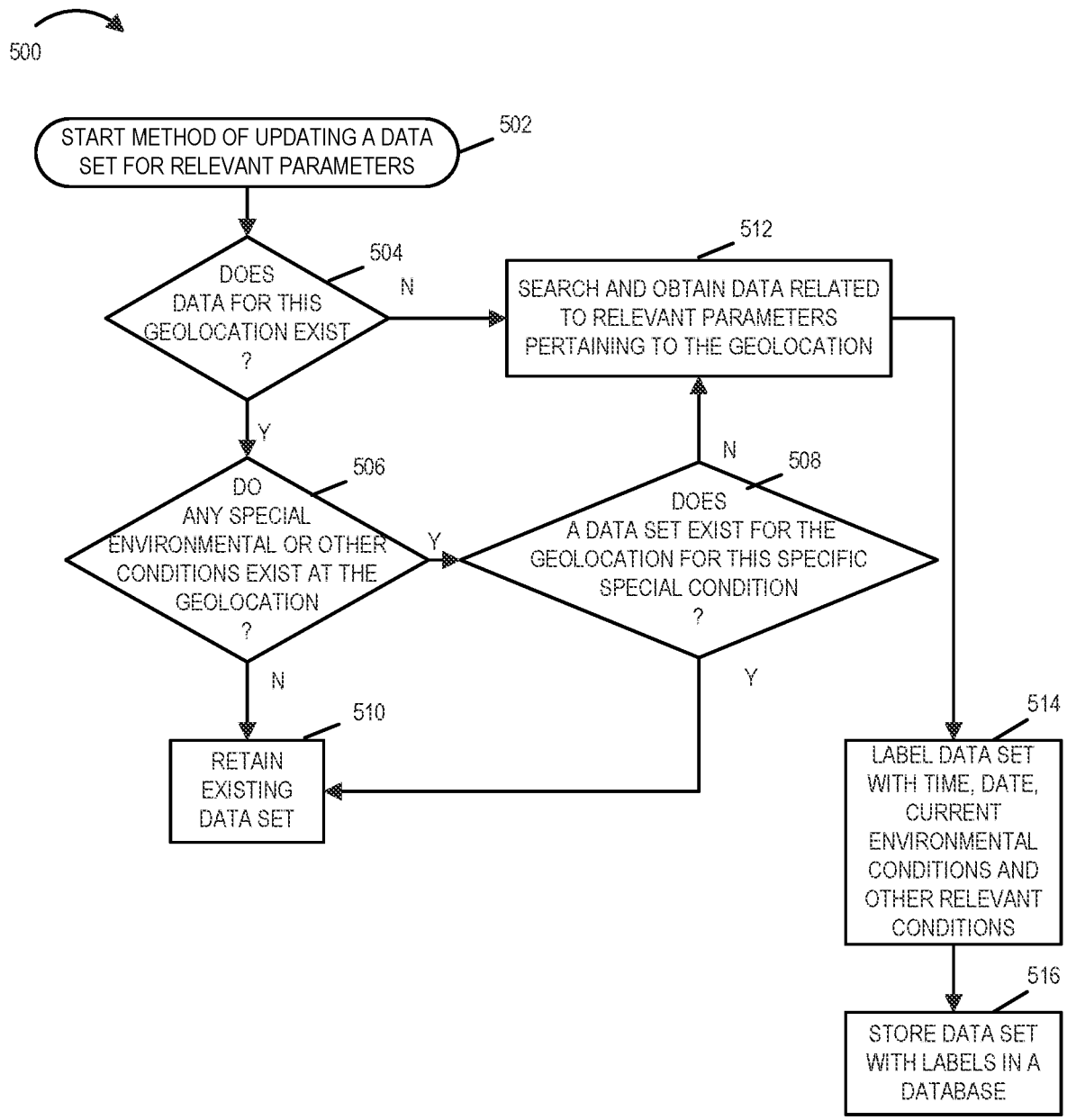
FIG. 6 is a flowchart of an exemplary method of updating a data set for relevant parameters in accordance with an exemplary embodiment.

FIG. 6 is a flowchart 500 of an exemplary method of updating a data set for relevant parameters in accordance with an exemplary embodiment. The method of flowchart 500 is, e.g., performed by the server implementing the method of flowchart 400 of FIG. 4. In some embodiments, the method of flowchart 500 is performed as part of step 412 or in addition to step 412, when step 412 is executed.

Operation of the exemplary method of flowchart 500 starts in step 502 and proceeds to step 504. In step 504 the server determines if data for this geolocation, e.g., the geolocation of the end user device which has been received in a request from the end user device, exists. If the determination of step 504 is that data for this geolocation does not exist, then operation proceeds from step 504 to step 512. However, if the determination of step 504 is that data for this geolocation does exist, then operation proceeds from step 504 to step 506.

In step 506 the server determines if any special environmental or other conditions exist at the geolocation. If the determination of step 506 is that there are not any special environmental or other conditions that exist at the geolocation, then operation proceeds from step 506 to step 510. In step 510 the server is operated to retain the existing data set. However, if the determination of step 506 is that there are one or more special environmental or other conditions that exist at the geolocation, then operation proceeds from step 506 to step 508.

In step 508 the server determines if a data set exists for the geolocation for this specific special condition. If the determination of step 508 is that a data set already exists for this geolocation for this specific condition, then operation proceeds from step 508 to step 510. In step 510 the server is operated to retain the existing data set. However, if the determination of step 508 is that a data set does not already exists for this geolocation for this specific condition, then operation proceeds from step 508 to step 512.

In step 512 the server searches and obtains data related to relevant parameters pertaining to the geolocation, e.g., the server contacts a weather server, request and obtains a set of expected outdoor conditions corresponding to the set of relevant parameters for the geolocation. Operation proceeds from step 512 to step 514.

In step 514 the server labels the data set with time, date, current environmental conditions and other relevant conditions. Operation proceeds from step 514 to step 516. In step 516 the server stores the data set with labels in a database, e.g., a database within the server or which is accessible by the server.

Figure 7:
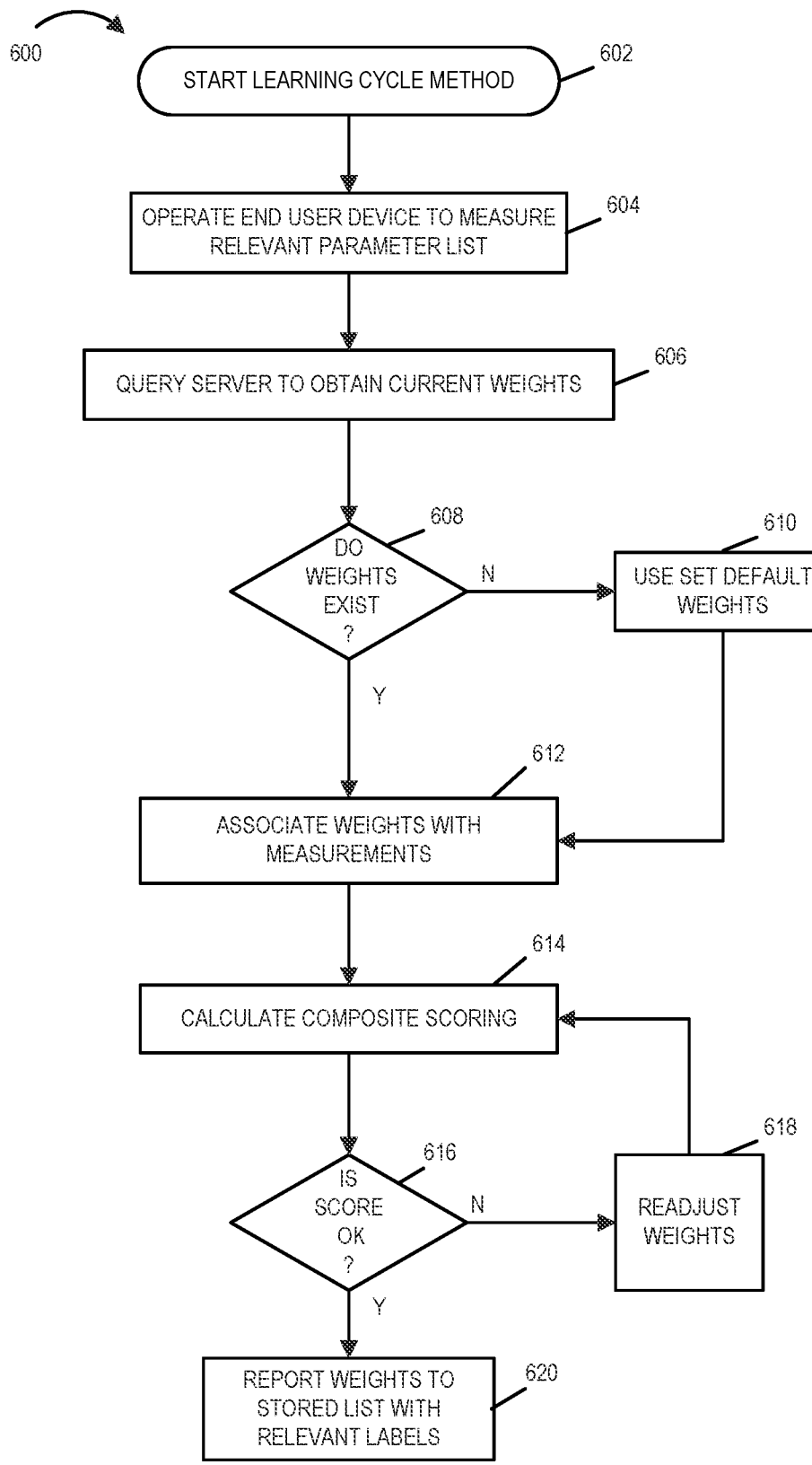
FIG. 7 is a flowchart of an exemplary learning cycle method in accordance with an exemplary embodiment.

FIG. 7 is a flowchart 600 of an exemplary learning cycle method in accordance with an exemplary embodiment. Operation of the exemplary method starts in step 602 and proceeds to step 604. In step 604 the end user device is operated to measure parameters indicated on a relevant parameter list, e.g., one or more or all of: temperature, wind speed, humidity, atmospheric pressure, luminosity, and audio level. Operation proceeds from step 604 to step 606.

In step 606, the server is queried to obtain current weights. Operation proceeds from step 606 to step 608.

In step 608, a determination is made as to whether or not the weights exist. If the query returns weights, then operation proceeds from step 608 to step 612, in which a returned set of weights are associated with the measurements of step 604. However, if weights do not exist, e.g., the query fails to return a set of weights, then operation proceeds from step 608 to step 610 in which a determination is made to use a default set of weights. Operation proceeds from step 610 to step 612, in which the set of default weights are associated with the measurements of step 612. Operation proceeds from step 612 to step 614.

In step 614 a composite score is calculated. Operation proceeds from step 614 to step 616. In step 616 a determination is made as to whether or not the score is ok, e.g., does the score correctly indicative of enclosure state. If the determination of step 616 is that the score is not ok, then operation proceeds from step 616 to step 618; otherwise, operation proceeds from step 616 to step 620. In step 618, the weights are readjusted, e.g., as part of an attempt to make the composite score be accurately indicative of enclosure state of the end user device at the location under test with the current conditions. Operation proceeds from step 618 to step 614, in which the composite score is recalculated using the readjusted weights. Operation proceeds from step 614 to step 616, in which the score is again checked to determine if it is ok. Returning to step 620, in step 620 the weights are reported to be stored as part of a list with relevant labels.

FIG. 8 is a drawing 700 including set of tables (702, 704, 706) illustrating exemplary weight values corresponding to temperature measurements for different locations and different months of the year, said weight values to be used in determining an enclosure state (indoors or outdoors) of a user device in accordance with an exemplary embodiment. A higher value indicates a higher weighting.

Table 702 illustrates exemplary weights, with regard to evaluating temperature measurements, for the location=Phoenix Arizona USA for each month. First row 708 identifies the different months (January, February, March, April, May, June, July, August, September, October, November, December), and the second row 710 identifies the corresponding weight value to be used (2, 2, 2, 3, 4, 5, 9, 9, 9, 4, 2, 2), respectively. In this example, the temperature evaluation, with regard to determining end user device enclosure state, is heavily weighted during the months of July, August and September, when the outside temperature is expected to be much higher than the inside temperature, since the indoors is expected to be air conditioned during the summer months in the hot summer climate of Arizona.

Table 704 illustrates exemplary weights, with regard to evaluating temperature measurements, for the location=Buffalo, New York USA for each month. First row 712 identifies the different months (January, February, March, April, May, June, July, August, September, October, November, December), and the second row 714 identifies the corresponding weight value to be used (9, 8, 7, 3, 4, 5, 5, 6, 6, 3, 8, 9), respectively. In this example, the temperature evaluation, with regard to determining end user device enclosure state, is heavily weighted during the months of January, February, March, November, and December, when the outside temperature is expected to be much colder than the inside temperature, since the indoors is expected to be heated during the Winter months in the cold Winter climate of Buffalo.

Table 706 illustrates exemplary weights, with regard to evaluating temperature measurements, for the location=San Diego, California USA for each month. First row 716 identifies the different months (January, February, March, April, May, June, July, August, September, October, November, December), and the second row 718 identifies the corresponding weight value to be used (2, 1, 1, 1, 1, 2, 2, 3, 3, 1, 1, 2), respectively. In this example, the temperature evaluation, with regard to determining end user device enclosure state, is lightly or only moderately weighted year round since the outdoor temperate is expected to be relatively close to the indoor temperature during most of the year with only slight temperature differences expected between indoor and outdoors. In such an environment, other measurements such as wind or audio level may be better suited and more heavily weighted to determine enclosure state of the end user device. For example, during certain months and specific times of the day, strong winds may be expected outdoors in San Diego, or in a location near a freeway or other roadway, the enclosure state may be easily and reliably detectable based on the presence or lack thereof of road noise, e.g., vehicle traffic noise.

Figure 9:
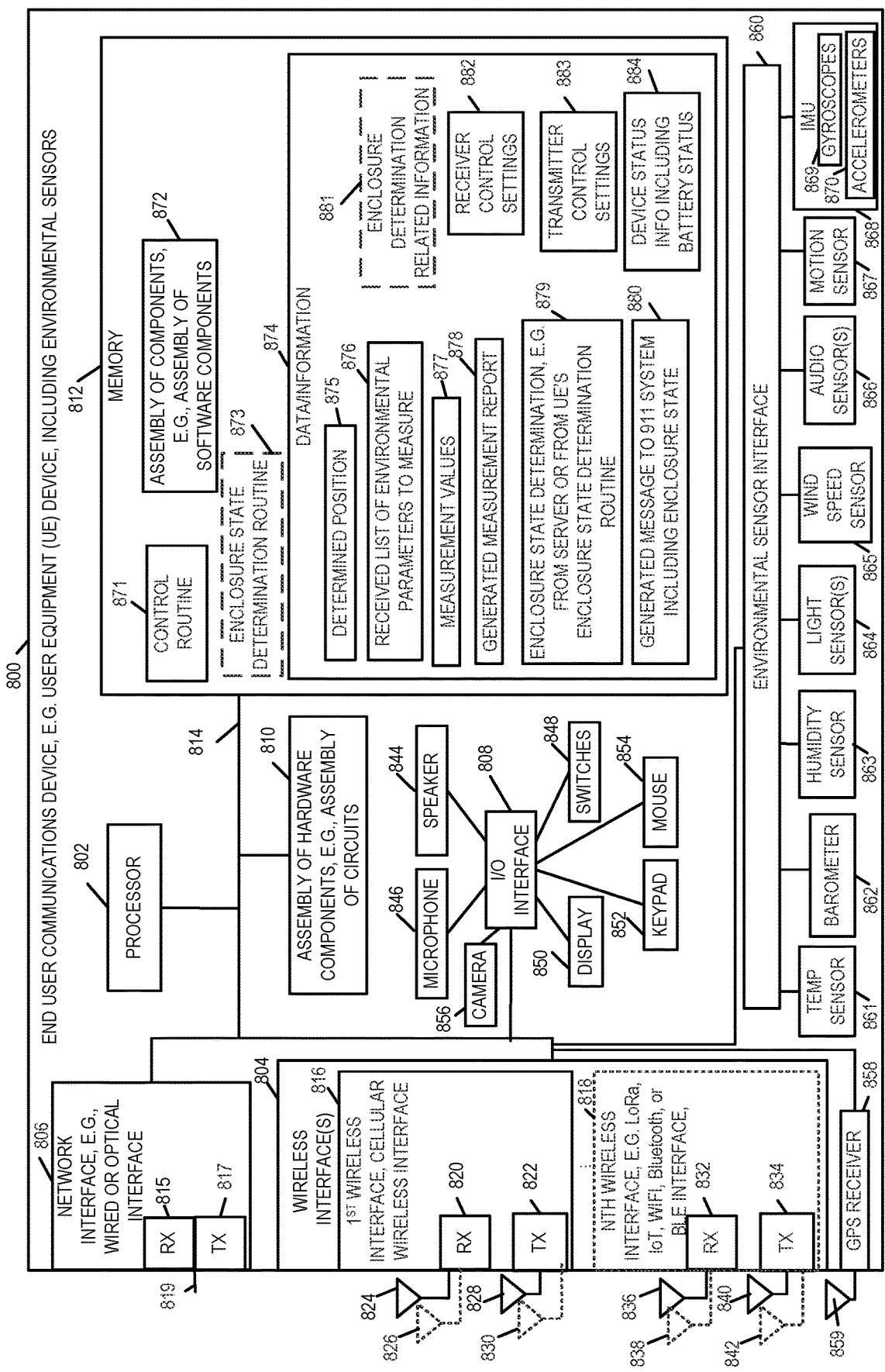
FIG. 9 is a drawing of an exemplary communications device, e.g. a user equipment (UE) device, in accordance with an exemplary embodiment.

FIG. 9 is a drawing of an exemplary end user communications device 800, e.g., a user equipment (UE) device, including a plurality of environmental sensors in accordance with an exemplary embodiment. Exemplary communications device 800 includes a processor 802, e.g., a CPU, wireless interfaces 804, a network interface 806, an input/output (I/O) interface 808, an assembly of hardware components 810, e.g., an assembly of circuits, memory 812, a GPS receiver 858, and an environmental sensor interface 806 coupled together via a via a bus 814 over which the various elements may interchange data and information.

Wireless interfaces 804 includes a plurality of wireless interfaces (1st wireless interface 816, e.g., a cellular wireless interface, . . . Nth wireless interface 818, e.g., a LoRa, IoT, WiFi, Bluetooth, or BLE interface). 1st wireless interface 816 includes wireless receiver 820 coupled to one or more receive antennas (824, . . . , 826) and wireless transmitter 822 coupled to one or more transmit antennas (828, . . . , 830). Nth wireless interface 818 includes wireless receiver 832 coupled to one or more receive antennas (836, . . . , 838) and wireless transmitter 834 coupled to one or more transmit antennas (840, . . . , 842). The communications device 800 can be and, and sometimes is coupled, via one or more wireless interfaces 804, to a network device including a wireless interface, e.g., a cellular base station, an access point, a gateway, etc., which is coupled to the Internet, a backhaul network one or more communications networks, and/or other network nodes, e.g., a enclosure state determination server, a weather server, and a 911 emergency response system network node and/or a UE of an emergency responder.

Network interface 806, e.g., a wired or optical interface, includes a receiver 815 and a transmitter 817, which are connected to coupler or connector 819. The communications device 800 may be, and sometimes is, connected to network nodes, e.g., via network interface when the communications device 800 is located at a site where a wired local network connection is available.

GPS receiver 858 is coupled to GPS antenna 859 via which GPS signals are received from satellites. The GPS receiver 858 determines communications device 800 position, altitude, and velocity based on the received GPS signals.

Communications device 800 further includes a plurality of I/O devices (speaker 844, microphone 846, switches 848, display 850, e.g., a touch screen display, keypad 852, mouse 854, and camera 856 coupled to I/O interface 808, which couples the various I/O devices to bus 814 and to other elements of device 800.

Communications device 800 further includes a plurality of environmental sensors (temperature sensor 861, barometer 862 for measuring atmospheric pressure, humidity sensor 863, light sensor(s) for measuring luminance and/or for detecting for the presence of particular light frequencies of interest, e.g. detecting UV light frequencies which are expected to be present in outdoor light from the sun but are not expected to be present in indoor electrical light bulb generated light, wind speed sensor 865, audio sensor(s) 866 for detecting audio levels and/or for detecting specific audio profiles, e.g. audio profiles corresponding to outdoor noises, e.g. traffic noise, wildlife noise, etc., a motion sensor 867 for detecting if communications device 800 is moving or stationary, and an inertial measurement unit (IMU) 868, e.g. an IMU on chip. The IMU 868 includes accelerometers 869 for measuring acceleration and gyroscopes 870 for measuring angular motion. The various environmental sensor (861, 862, 863, 864, 865, 866, 867, 868) are coupled to environmental sensor interface 860, which couples the sensors to bus 814 and to other elements of device 800.

Memory 812 includes a control routine 871 for controlling various basic functions of the communications device 800, e.g., memory read/write operations, network interface control, I/O control, sensor control, etc. Memory 812 further includes an assembly of components 872, e.g., an assembly of software components, e.g., software routines and/or modules. In some embodiments, e.g., an embodiment in which the enclosure state determination is performed by communications device 800, e.g., by processor 802, memory 812 includes an enclosure state determination routine 873. In some other embodiments, e.g., an embodiment in which the enclosure state determination is performed by a server, e.g., enclosure state determination server 900 of FIG. 9, memory 812 does not include enclosure state determination routine 873.

Memory 812 further includes data/information 874. Data/information 874 includes a determined position 875 of the communications device 800, e.g. based on GPS receiver 858 information and/or IMU 868 information, a received list of environmental parameters to measure 876, environmental sensor measurement values 877, a generated measurement report 878 including the environmental sensor measurement values, an enclosure state determination 879, e.g. from an enclosure state determination server or from the UE's enclosure state determination routine 873, a generated message 880 to be sent to a 911 system, said generated message including the determined enclosure state of communications device 800 and optionally including additional environmental information, receiver control settings 882, transmitter control settings 883, and device status information 884 including battery status information. In some embodiments, e.g., an embodiment in which the communications device 800 includes enclosure state determination routine 873, data/information 874 further includes enclosure state determination related information 881, e.g., the set of information (926, 928, 930, 932, 934, 936, 938, 940, 942, . . . , 944, 946, 948, 950) included in data/information 924 of server 900.

Figure 10:
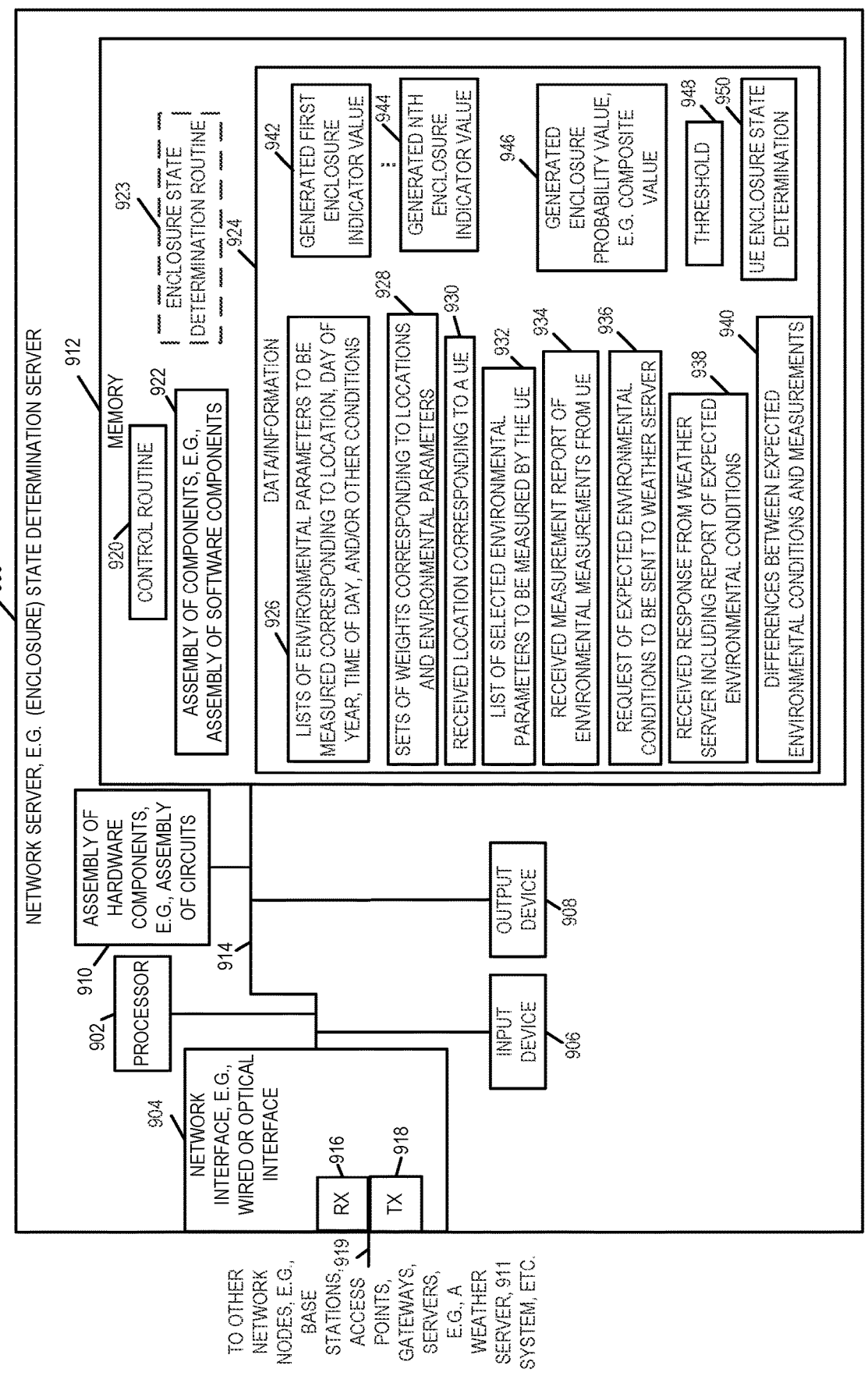
FIG. 10 is a drawing of an exemplary server, e.g. a enclosure state determination server, in accordance with an exemplary embodiment.

FIG. 10 is a drawing of an exemplary server 900, e.g., a enclosure state determination server, in accordance with an exemplary embodiment. Exemplary server 900 includes a processor 902, e.g., a CPU, a network interface 904, e.g., a wired or optical interface, an input device 906, e.g., a keyboard and/or mouse, and output device 908, e.g., a display, and assembly of hardware components 910, e.g., an assembly of circuits, and memory 912 coupled together via a bus 914 over which the various elements may interchange data and information.

Network interface 904 includes a receiver 916 and a transmitter 918 connected a connector or coupler 919, via which the server 900 may communicate with other network nodes, e.g., base stations, access points, gateways, servers, e.g., a weather server, a 911 emergency system server, etc. Exemplary signals received via receiver 916 include a message from a UE communicating its current position, a request from a UE requesting an enclosure state determination, a report from a UE including environmental measurements, and a report from a weather server communicating a set of expected environmental conditions. Exemplary signals transmitted via transmitter 918 include a list of environmental parameters that a UE is to measure and report back on, a request to a weather server of a set of expected outdoor environmental conditions corresponding to a location, day of year, and time of day, and a determined enclosure state for a UE, which is directed to the UE.

Memory 912 includes control routine 920, assembly of components 922, e.g., an assembly of software components, e.g., software routines and/or software modules, and data/information 924. Data/information 924 includes lists 926 of environmental parameters to be measured, e.g., each list of environmental parameters to be measured corresponding to a UE or set of UEs, location information, e.g., an area, time information, e.g., day(s) of year, time(s) of day, and/or other conditions. Data/information 924 further includes sets of weights corresponding to locations, times, and environmental parameters, e.g., a set of weights with each value in the set corresponding to a combination of a particular environmental parameter, e.g., temperature, a particular location, e.g., a particular city, and a particular time, e.g., month of the year. Data/information 924 further includes a received location 930 corresponding to a UE, a list 932 of selected environmental parameters to be measured by the UE, a received measurement report 934 of environmental measurements from the UE, a generated request 936 for a specific set of expected outdoor environmental conditions corresponding to a location, said request to be sent to a weather server, a received response 938 from the weather server including a report of expected outdoor environmental conditions for the specified location, determined differences 940 between expected outdoor environmental conditions (obtained from the weather server) and actual reported environmental measurements (obtained from the UE), a generated first enclosure indicator value 942, . . . , a generated Nth enclosure indicator value 944, a generated overall enclosure probability value 946, e.g. a generate composite value, a threshold 948 used to compare against the generated enclosure probability value to determine enclosure state of the UE, e.g., enclosed state (indoors) or not enclosed state (outdoors), and the result 950 of the UE enclosure state determination which is to be communicated to the UE.

Figure 11:
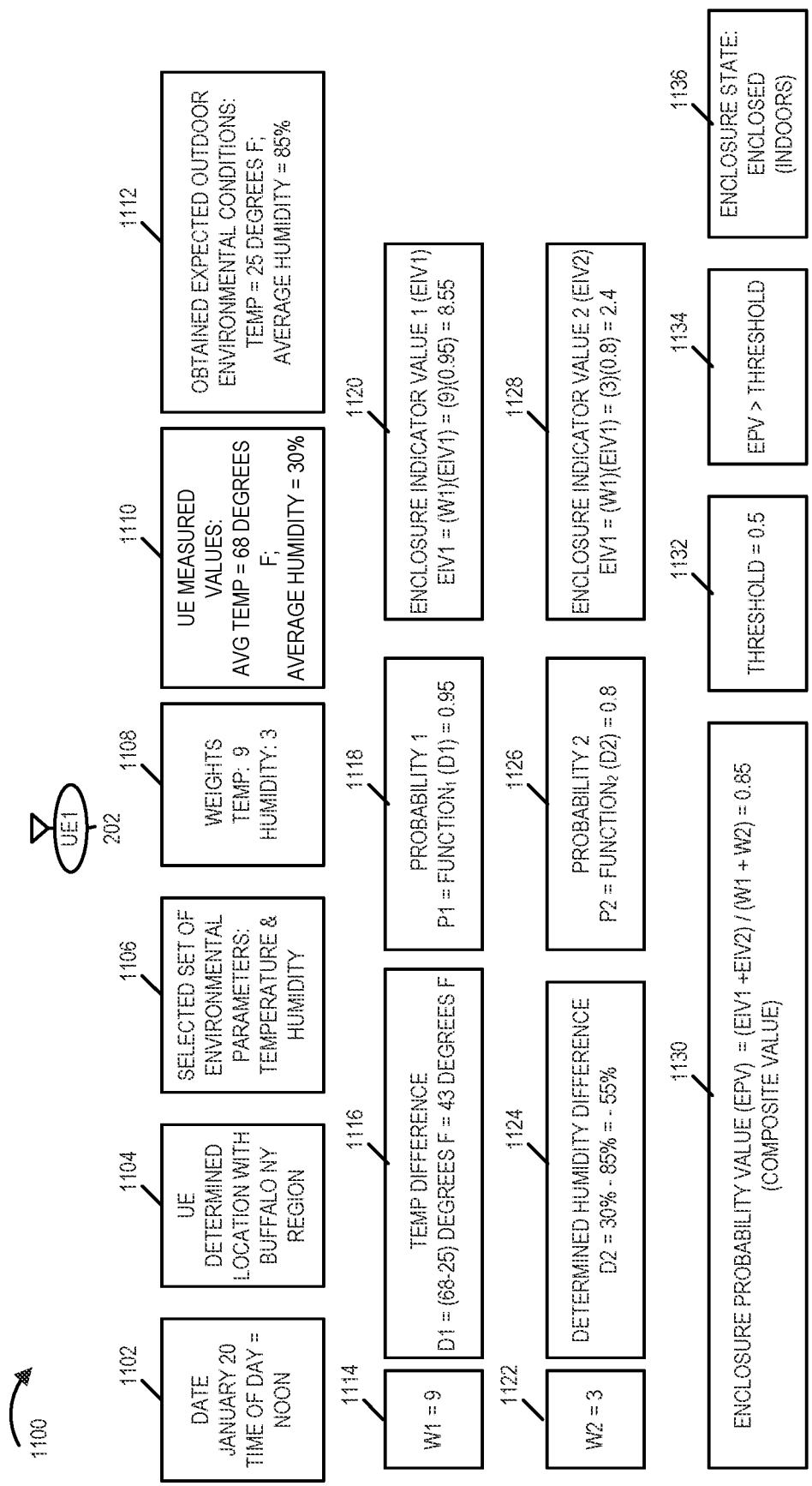
FIG. 11 is a drawing illustrating an example in which an enclosure state determination is performed for a first exemplary UE in accordance with an exemplary embodiment.

FIG. 11 is a drawing 1100 illustrating an example in which an enclosure state determination is performed for a first exemplary UE in accordance with an exemplary embodiment. The first exemplary UE is UE 1 202, e.g., located as shown in FIG. 1. Time and/or date information 1102 indicates that the time of interest is January 20 at noon. The UE determined location for UE 1 202 e.g., based on GPS data, as indicated in block 1104, is within the Buffalo NY region. The selected set of relevant environment parameters for measurement and evaluation for UE 1 202 on January 20th at noon is: i) temperature and ii) humidity, as indicated by block 1106. The weights to be used corresponding to January 20 noon are: weight value=9 for temperature and weight value=3 for humidity, as indicated by block 1108. The temperature weight value=9 is obtained from previously weight table 704 (corresponding to Buffalo, NY) of set of tables 700 of FIG. 8. The humidity weight value=3 is, e.g., obtained from a similar humidity table for Buffalo NY The UE 1 202 measured and reported values are: average temperature=68 degrees F., average humidity=30%, as indicated in block 1110. The obtained expected outdoor environmental conditions, e.g., from a weather server, for January 20 at noon, are: temperature=25 degrees F. and average humidity=85%, as indicated by block 1112.

Row 1113 illustrates inputs and exemplary processing to obtain a first enclosure indicator value corresponding to the temperature parameter. The temperature weight value is W1, and W1=9, as indicated by block 1114. A temperature difference (D1) between the UE measurement and the expected outdoor temperature is calculated; D1=68 degrees F.-25 degrees F.=43 degrees F., as indicated by block 1116. A first probability (P1) is determined, where P1=function1 (D1). In this example P1=function1 (D1=43F) is determined to equal 0.95, as indicated by block 1118. Note that exemplary function1 has an output in the range of 0 to 1; P1=0 for D1=0, and, in some embodiments, P1 increases as the magnitude of D1 increases. The first enclosure indicator value (EIV1) is calculated, where EIV1=(W1)(P1). In this example, EIV1=(9)(0.95)=8.55, as indicated by block 1120.

Row 1121 illustrates inputs and exemplary processing to obtain a second enclosure indicator value corresponding to the humidity parameter. The humidity weight value is W2, and W2=3, as indicated by block 1122. A humidity difference (D2) between the UE measurement and the expected outdoor humidity is calculated; D2=30%-85%=-55%, as indicated by block 1124. A second probability (P2) is determined, where P2=function2 (D2). In this example P2=function2 (D2=−55%) is determined to equal 0.8, as indicated by block 1126. Note that exemplary function2 has an output in the range of 0 to 1; P2=0 for D2=0, and, in some embodiments, P2 increases as the magnitude of D2 increases. The second enclosure indicator value (EIV2) is calculated, where EIV2=(W2)(P2). In this example, EIV2=(3)(0.8)=2.4, as indicated by block 1128.

Row 1129 illustrates inputs and exemplary processing to obtain an enclosure state determination for UE 1 202 based on the determined enclosure indicator values, the weights used and a threshold. An enclosure probability value (EPV), sometimes referred to as a composite value, is calculated by, the equation EPV=(EIV1+EIV2)/(W1+W2), as indicated by block 1130. In this example, EIV is determined to equal 0.85, as indicated in block 1130. The EPV is compared, as indicated by block 1134, to a threshold=0.5, as indicated in block 1132. Since the EPV is determined to be greater than the threshold, UE 1 202 is determined to have an enclosure state=enclosed, which indicates the UE 1 202 is indoors, as indicated by block 1136.

Figure 12:
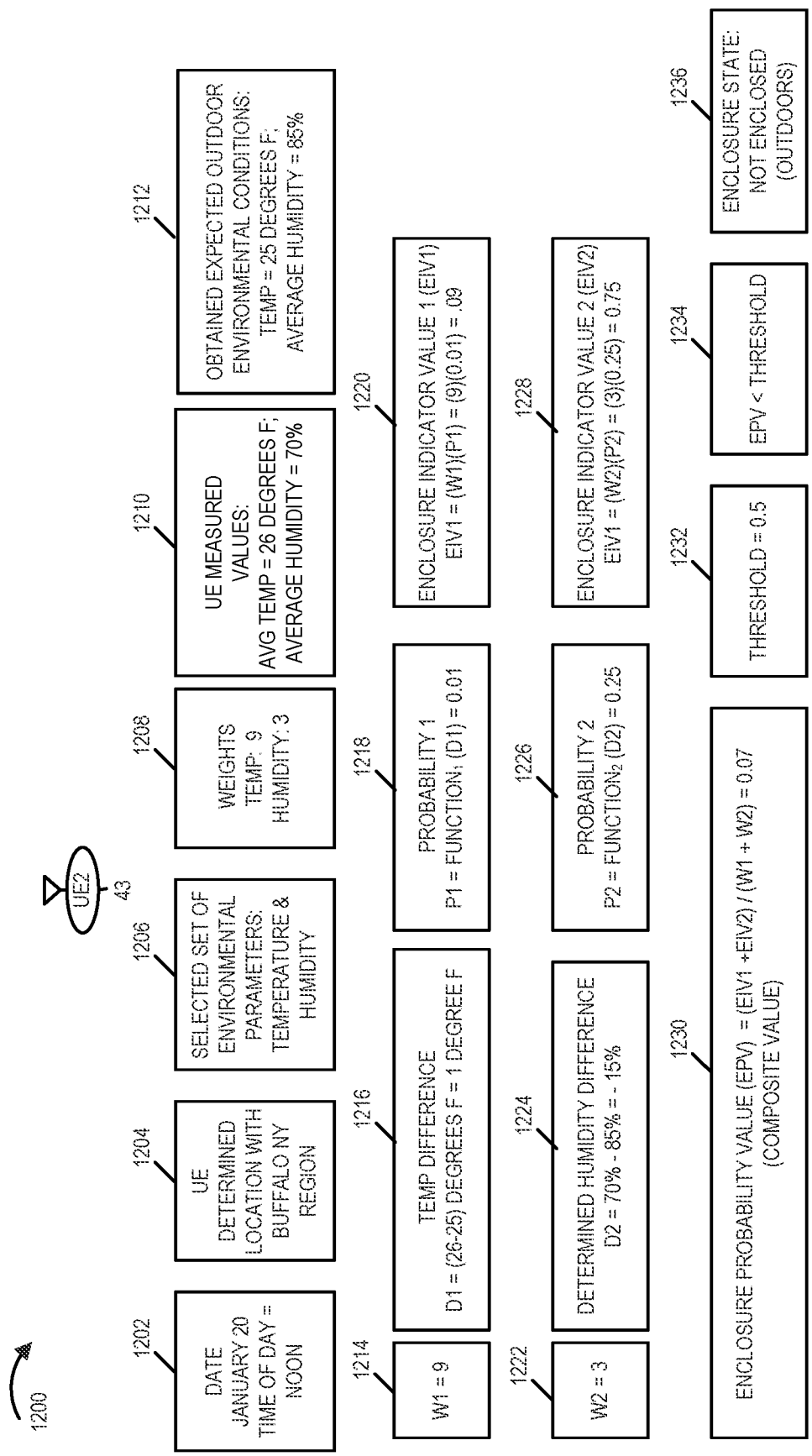
FIG. 12 is a drawing illustrating an example in which an enclosure state determination is performed for a second exemplary UE in accordance with an exemplary embodiment.

FIG. 12 is a drawing 1200 illustrating an example in which an enclosure state determination is performed for a second exemplary UE in accordance with an exemplary embodiment. The second exemplary UE is UE 2 43, e.g., located as shown in FIG. 1. Time/date information 1202 indicates that the time of interest is January 20 at noon. The UE determined location for UE 2 43 e.g., based on GPS data, as indicated in block 1204, is within the Buffalo NY region. The selected set of relevant environment parameters for measurement and evaluation for UE 2 43 on January 20th at noon is: i) temperature and ii) humidity, as indicated by block 1206. The weights to be used corresponding to January 20 noon are: weight value=9 for temperature and weight value=3 for humidity, as indicated by block 1208. The temperature weight value=9 is obtained from previously weight table 704 (corresponding to Buffalo, NY) of set of tables 700 of FIG. 8. The humidity weight value=3 is, e.g., obtained from a similar humidity table for Buffalo NY The UE 2 43 measured and reported values are: average temperature=26 degrees F., average humidity=70%, as indicated in block 1210. The obtained expected outdoor environmental conditions, e.g., from a weather server, for January 20 at noon, are: temperature=25 degrees F. and average humidity=85%, as indicated by block 1212.

Row 1213 illustrates inputs and exemplary processing to obtain a first enclosure indicator value corresponding to the temperature parameter. The temperature weight value is W1, and W1=9, as indicated by block 1214. A temperature difference (D1) between the UE measurement and the expected outdoor temperature is calculated; D1=26 degrees F.-25 degrees F.=1 degree F., as indicated by block 1216. A first probability (P1) is determined, where P1=function1 (D1). In this example P1=function1 (D1=1F) is determined to equal 0.01, as indicated by block 1218. Note that exemplary function1 has an output in the range of 0 to 1; P1=0 for D1=0, and, in some embodiments, P1 increases as the magnitude of D1 increases. The first enclosure indicator value (EIV1) is calculated, where EIV1=(W1)(P1). In this example, EIV1=(9)(0.01)=0.09, as indicated by block 1220.

Row 1221 illustrates inputs and exemplary processing to obtain a second enclosure indicator value corresponding to the humidity parameter. The humidity weight value is W2, and W2=3, as indicated by block 1222. A humidity difference (D2) between the UE measurement and the expected outdoor humidity is calculated; D2=70%-85%=−15%, as indicated by block 1224. A second probability (P2) is determined, where P2=function2 (D2). In this example P2=function2 (D2=−15%) is determined to equal 0.25, as indicated by block 1226. Note that exemplary function2 has an output in the range of 0 to 1; P2=0 for D2=0, and, in some embodiments, P2 increases as the magnitude of D2 increases. The second enclosure indicator value (EIV2) is calculated, where EIV2=(W2)(P2). In this example, EIV2=(3)(0.25)=0.75, as indicated by block 1228.

Row 1229 illustrates inputs and exemplary processing to obtain an enclosure state determination for UE 2 43 based on the determined enclosure indicator values, the weights used and a threshold. An enclosure probability value (EPV), sometimes referred to as a composite value, is calculated by, the equation EPV=(EIV1+EIV2)/(W1+W2), as indicated by block 1130. In this example, EIV is determined to equal 0.07, as indicated in block 1230. The EPV is compared, as indicated by block 1234, to a threshold=0.5, as indicated in block 1232. Since the EPV is determined to be less than the threshold, UE 2 43 is determined to have an enclosure state=not enclosed, which indicates the UE 2 43 is outdoors, as indicated by block 1236.

Figure 13A:
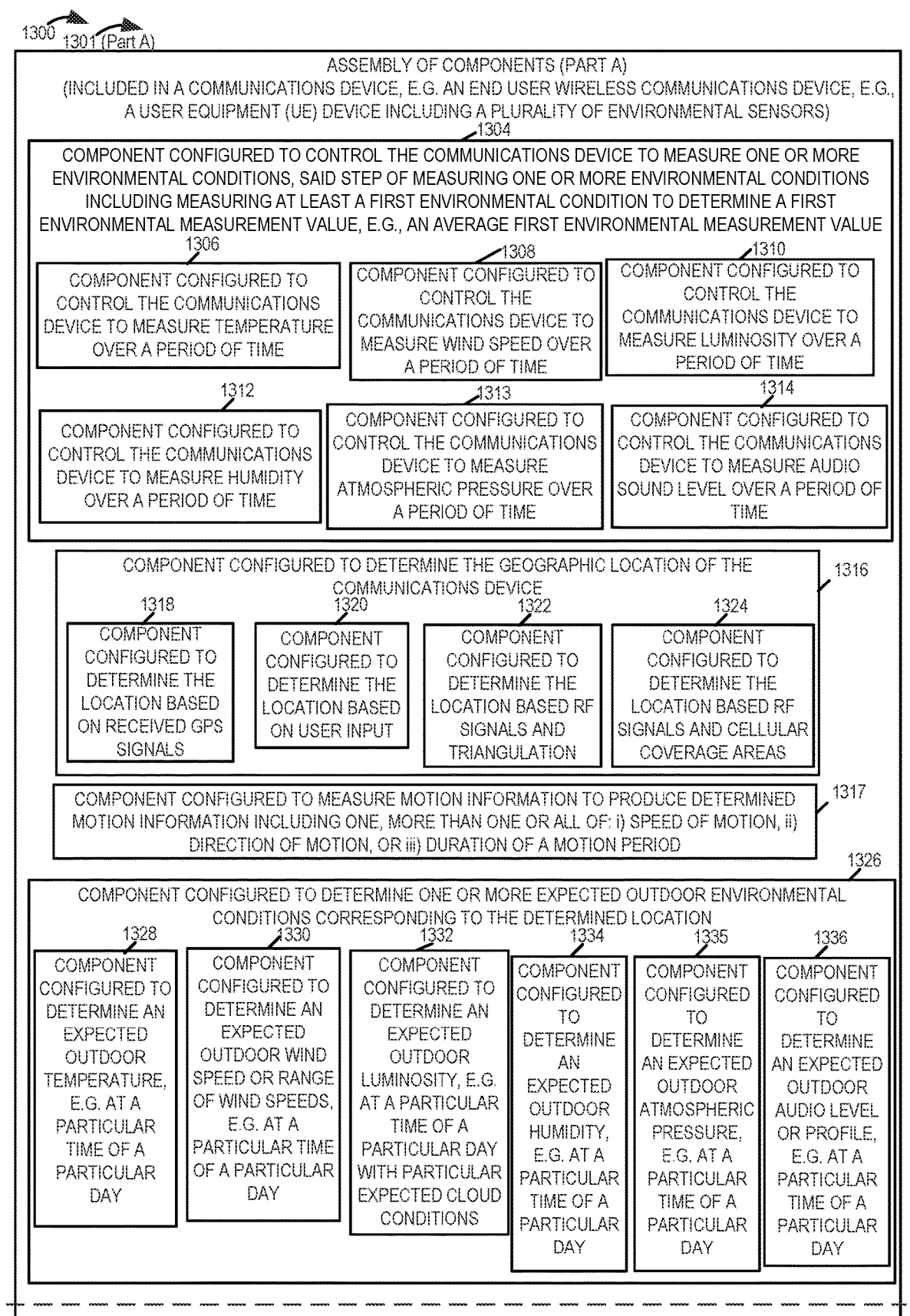
FIG. 13A is a first part of a drawing of an exemplary assembly of components which may be included in an exemplary communications device, e.g. a user equipment (UE) device including a plurality of environmental sensors, in accordance with an exemplary embodiment.
Figure 13B:
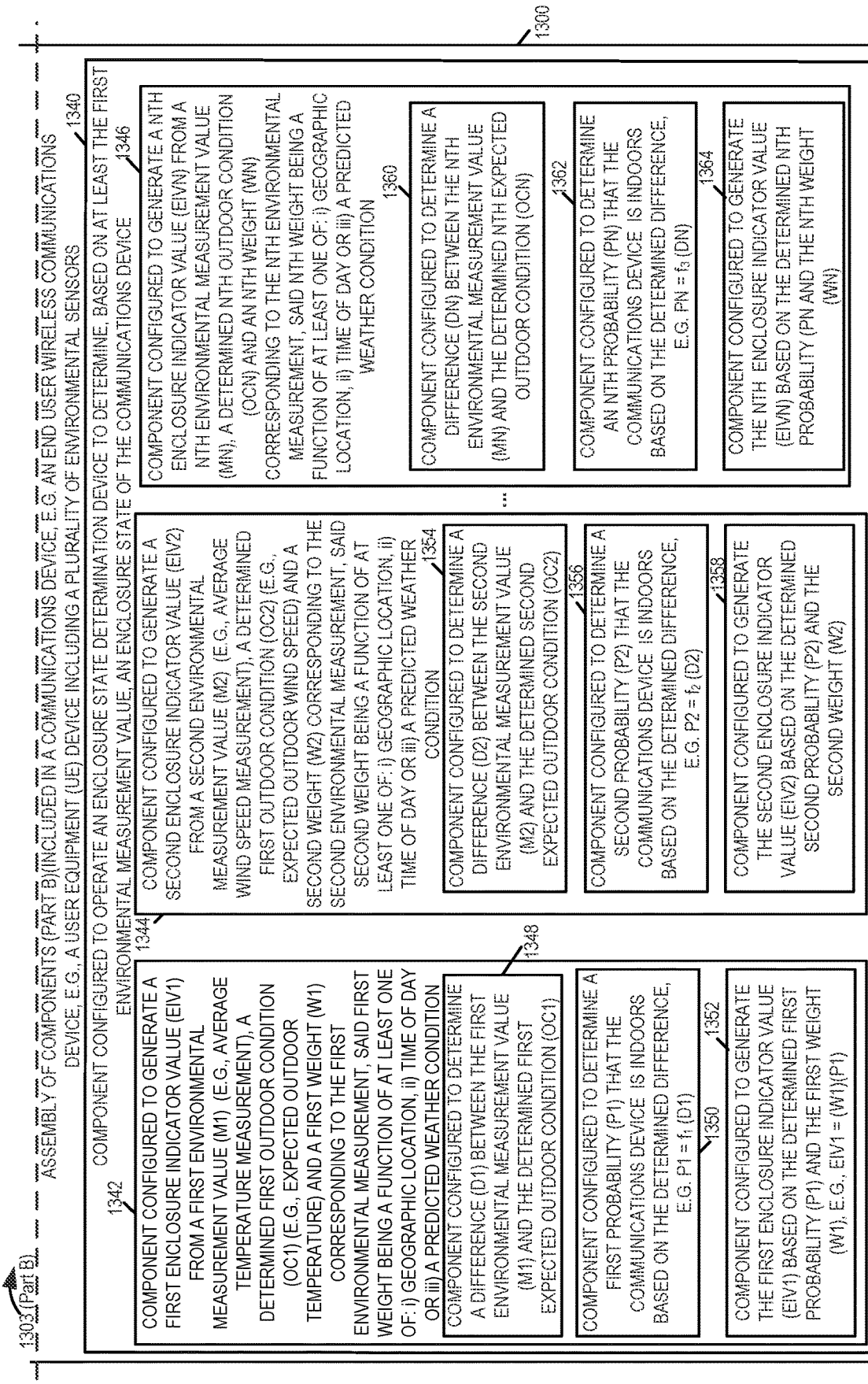
FIG. 13B is a second part of a drawing of an exemplary assembly of components which may be included in an exemplary communications device, e.g. a user equipment (UE) device including a plurality of environmental sensors, in accordance with an exemplary embodiment.
Figure 13C:
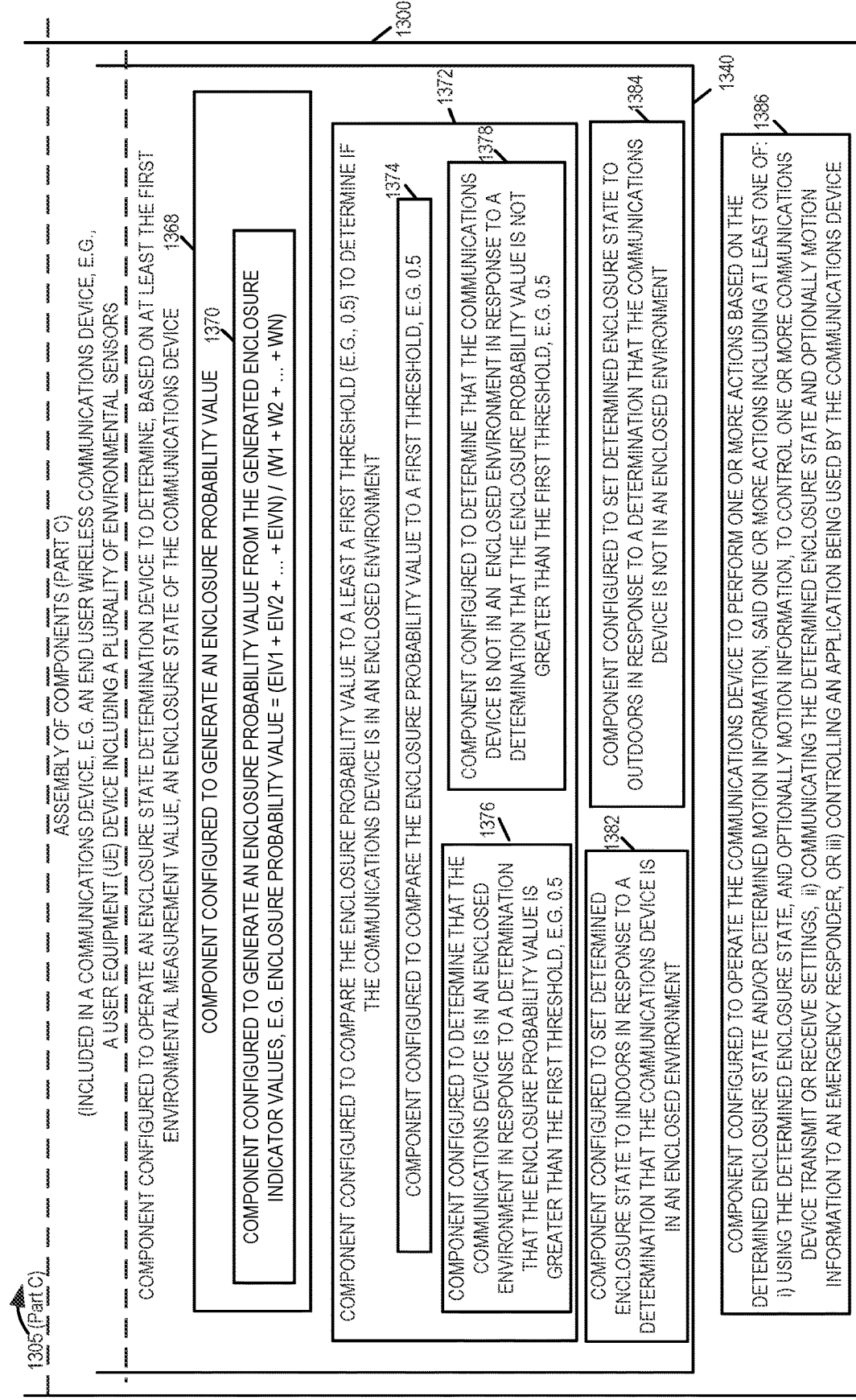
FIG. 13C is a third part of a drawing of an exemplary assembly of components which may be included in an exemplary communications device, e.g. a user equipment (UE) device including a plurality of environmental sensors, in accordance with an exemplary embodiment.

FIG. 13, comprising the combination of FIG. 13A, FIG. 13B and FIG. 13C, is a drawing of an assembly of components 1300, comprising the combination of Part A 1301, Part B 1303 and Part C 1305, in accordance with an exemplary embodiment. Assembly of components 1300 may be, and sometimes is, included in an exemplary communications device, e.g. an end user wireless communications device, e.g., a user equipment (UE) device including a plurality of environmental sensors. Assembly of components 1330 is, e.g. included in any of UE 1 202, UE 2 43, UE 3 45, UE 4 47, UE 5 51, UE 6 53, UE 7 57, UE 8 59 of system 10 of FIG. 1, a communications device, e.g. a UE implementing one or more steps of flowchart 100 of FIG. 2, UE 1 202 of signaling drawing 200 of FIG. 3, communications device 800, e.g. a UE, of FIG. 9, UE 1 202 of FIG. 11, UE 2 43 of FIG. 12, and/or a communications device, e.g., a UE, implementing steps of a method described in the application and/or with respect to any of the Figures.

The components in the assembly of components 1300 can, and in some embodiments are, implemented fully in hardware within a processor, e.g., processor 802, e.g., as individual circuits. The components in the assembly of components 1300 can, and in some embodiments are, implemented fully in hardware within the assembly of hardware components 810, e.g., as individual circuits corresponding to the different components. In other embodiments some of the components are implemented, e.g., as circuits, within processor 802 with other components being implemented, e.g., as circuits within assembly of components 810, external to and coupled to the processor 802. As should be appreciated the level of integration of components on the processor and/or with some components being external to the processor may be one of design choice. Alternatively, rather than being implemented as circuits, all or some of the components may be implemented in software and stored in the memory 812 of the communications device 800, with the components controlling operation of communications device 800 to implement the functions corresponding to the components when the components are executed by a processor e.g., processor 802. In some such embodiments, the assembly of components 1300 is included in the memory 1312 as part of assembly of software components 872 and/or enclosure state determination routine. In still other embodiments, various components in assembly of components 1300 are implemented as a combination of hardware and software, e.g., with another circuit external to the processor providing input to the processor which then under software control operates to perform a portion of a component's function.

When implemented in software the components include code, which when executed by a processor, e.g., processor 802, configure the processor to implement the function corresponding to the component. In embodiments where the assembly of components 1300 is stored in the memory 812, the memory 812 is a computer program product comprising a computer readable medium comprising code, e.g., individual code for each component, for causing at least one computer, e.g., processor 802, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 13 control and/or configure the communications device 800 or elements therein such as the processor 802, to perform the functions of corresponding steps illustrated and/or described in the method of one or more of the flowcharts, signaling diagrams and/or described with respect to any of the Figures. Thus, the assembly of components 1300 includes various components that perform functions of corresponding one or more described and/or illustrated steps of an exemplary method, e.g., steps of the method of flowchart 100 of FIG. 2 and/or steps of the method of signaling diagram 200 of FIG. 3.

Assembly of components 1300 includes a component 1304 configured to control the communications device to measure one or more environmental conditions, said step of measuring one or more environmental conditions including measuring at least a first environmental condition to determine a first environmental measurement value, e.g. an average first environmental measurement value. In various embodiments, component 1304 includes two or more or all of a component 1306 configured to control the communications device to measure temperature over a period of time, a component 1308 configured to control the communications device to measure wind speed over a period of time, a component 1310 configured to control the communications device to measure luminosity over a period of time, a component 1312 configured to control the communications device to measure humidity over a period of time, a component 1313 configured to control the communications device to measure atmospheric pressure over a period of time, and a component 1314 configured to control the communications device to measure audio sound level over a period of time.

Assembly of components 1300 further includes a component 1315 configured to determine the geographic location of the communications device. In various embodiments, component 1316 includes one or more of all of: a component 1318 configured to determine the location of the communications device based on received GPS signals, a component 1320 configured to determine the location of the communications device based on user input, a component 1322 configured to determine the location of the communications device based on RF signals and triangulation, e.g., received RF reference signals from a plurality a base stations at known locations and triangulation performed by the communications device, and a component 1324 configured to determine the location of the communications device based on RF signals and cellular coverage areas corresponding to a plurality of base stations. In some embodiments, component 1316 is further configured to use inertial measurement unit (IMU) information to determine the geographic information of the communications device, e.g., when GPS data is unavailable or as an aid to obtain a more accurate position when GPS data, e.g., low quality GPS data is available. Assembly of components 1300, in some embodiments, further includes a component 1317 configured to measure, at the communications device, motion information to produce determined motion information including one, more than one or all of: i) speed of motion, ii) direction of motion, or iii) duration of a motion period.

Assembly of components 1300, in some but not necessarily all embodiments, further includes a component 1326 configured to determine one or more expected outdoor environmental conditions corresponding to the determined location of the communications device. In some embodiments, component 1326 includes one or more or all of: a component 1328 configured to determine an expected outdoor temperature, e.g., at a particular time of a particular day for the determined location, a component 1330 configured to determine an expected outdoor wind speed and/or range of expected outdoor wind speeds and/or expected outdoor peak wind speed, at a particular time of a particular day for the determined location, a component 1332 configured to determine an expected outdoor luminosity, e.g. at a particular time of a particular day with particular expected cloud conditions for the determined location, a component 1335 configured to determine an expected outdoor atmospheric pressure, e.g. at a particular time of a particular day for the determined location, and a component 1336 configured to determine an expected outdoor audio level and/or an expected outdoor audio profile, e.g. at a particular time of a particular day for the determined location.

Assembly of components 1300, in some but not necessarily all embodiments, further includes a component 1340 configured to operate an enclosure state determination device, e.g., a processor, in the communications device, to determine based on at least a first environmental measurement value, an enclosure state of the communications device. Component 1340 includes a component 1342 configured to generate a first enclosure indicator value (EIV1) from a first environmental measurement value (M1), e.g., an average temperature measurement, a determined first outdoor condition (OC1), e.g., an expected outdoor temperature, and a first weight (W1) corresponding to the first environmental measurement, said first weight being a function of at least one of: i) geographic location, ii) time of day, or iii) a predicted weather condition; a component 1344 configured to generate a second enclosure indicator value (EIV2) from a second environmental measurement value (M2), e.g., an average wind speed measurement, a determined second outdoor condition (OC2), e.g., an expected outdoor wind speed, and a second weight (W2) corresponding to the second environmental measurement, said first weight being a function of at least one of: i) geographic location, ii) time of day, or iii) a predicted weather condition; and a component 1346 configured to generate an Nth enclosure indicator value (EIVN) from an Nth environmental measurement value (MN), a determined Nth outdoor condition (OCN), and an Nth weight (WN) corresponding to the Nth environmental measurement, said Nth weight being a function of at least one of: i) geographic location, ii) time of day, or iii) a predicted weather condition.

Component 1342 includes a component 1348 configured to determine a difference (D1) between the first environmental measurement value (M1) and the determined first expected outdoor condition (OC1), a component 1350 configured to determine a first probability (P1) that the communications device is indoors based on the determined difference, e.g., P1=function1 (D1), and a component 1352 configured to generate the first enclosure indicator value (EIV1) based on the determined first probability (P1) and the first weight W1, e.g., EIV1=(W1)(P1). Component 1344 includes a component 1354 configured to determine a difference (D2) between the second environmental measurement value (M2) and the determined second expected outdoor condition (OC2), a component 1356 configured to determine a second probability (P2) that the communications device is indoors based on the determined difference, e.g., P2=function2 (D2), and a component 1358 configured to generate the second enclosure indicator value (EIV2) based on the determined second probability (P2) and the second weight W2, e.g., EIV2=(W2)(P2). Component 1346 includes a component 1360 configured to determine a difference (DN) between the Nth environmental measurement value (MN) and the determined Nth expected outdoor condition (OCN), a component 1362 configured to determine an Nth probability (PN) that the communications device is indoors based on the determined difference, e.g., PN=functionN (DN), and a component 1364 configured to generate the Nth enclosure indicator value (EIVN) based on the determined second probability (PN) and the second weight WN, e.g., EIVN=(WN)(PN).

Component 1340 further includes a component 1368 configured to generate an enclosure probability value 1368. Component 1368 includes a component 1370 configured to generate an enclosure probability value from the generated enclosure indicator values, e.g. the enclosure probability value=(EIV1+EIV2+ . . . +EIVN)/(W1+W2+ . . . +WN).

Component 1340 further includes a component 1372 configured to compare the enclosure probability value to a least a first threshold, e.g., 0.5, to determine if the communications device is in an enclosed environment. Component 1372 includes a component 1374 configured to compare the enclosure probability value to a first threshold, e.g. 0.5, a component 1376 configured to determine that the communications device is in an enclosed environment in response to a determination that the enclosure probability value is greater than the first threshold, and a component 1378 configured to determine that the communications device is not in an enclosed environment in response to a determination that the enclosure probability value is not greater than the first threshold.

Component 1340 further includes a component 1382 configured to set the determined enclosure state to indoors in response to a determination that the communications device is in an enclosed environment, and a component 1384 configured to set the determined enclosure state to outdoors in response to a determination that the communications device is not in an enclosed environment.

Component 1300 further includes a component 1386 configured to operate the communications device to perform one or more actions based on the determined enclosure state and/or determined motion information, said one or more actions including at least one of: i) using the determined enclosure state, and optionally motion information, to control one or more communications device transmit or receive settings, ii) communicating the enclosure state and optionally motion information to an emergency responder, or iii) controlling an application being used by the communications device.

Figure 14A:
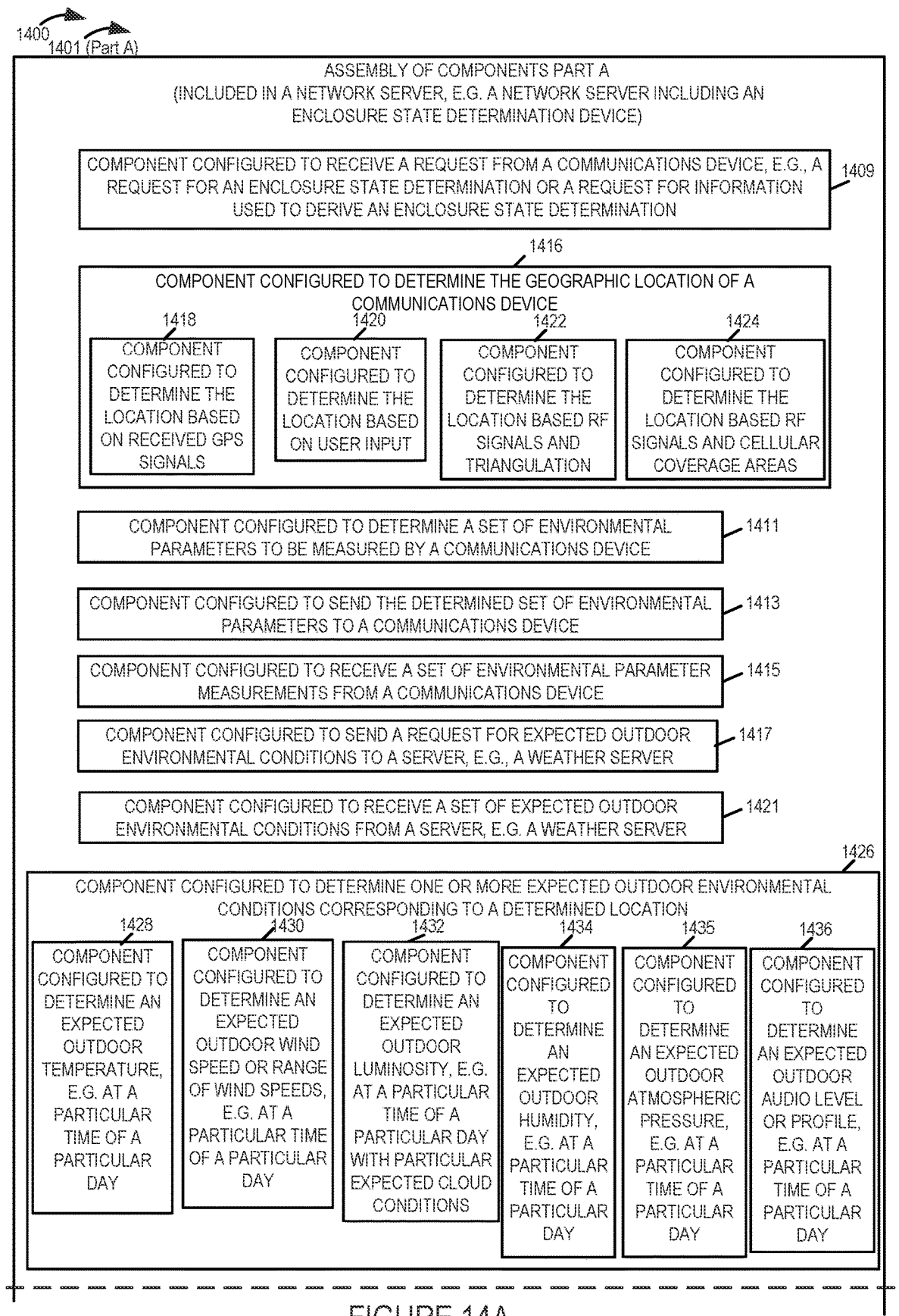
FIG. 14A is a first part of drawing of an exemplary assembly of components which may be included in an exemplary network server in accordance with an exemplary embodiment.
Figure 14B:
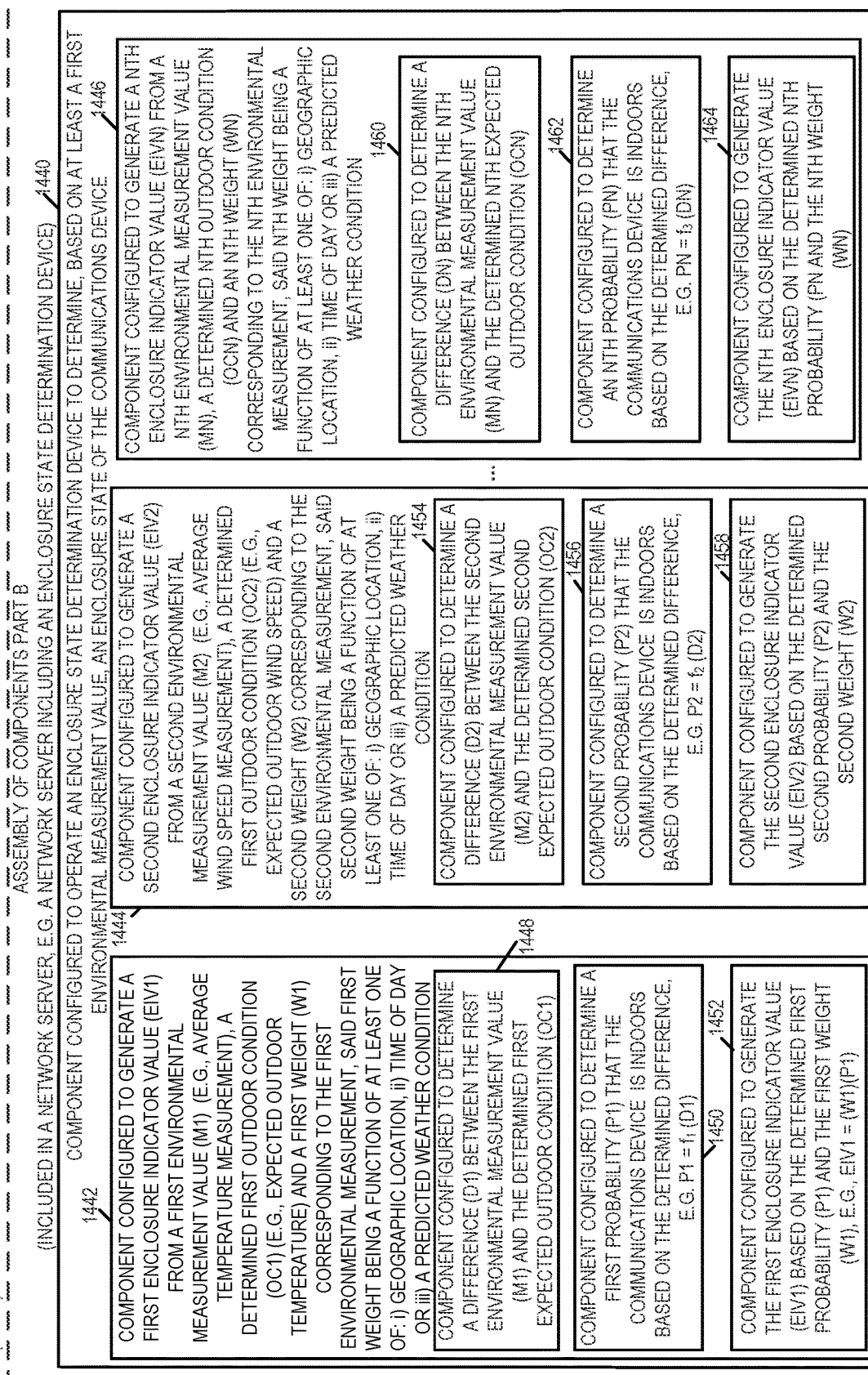
FIG. 14B is a second part of drawing of an exemplary assembly of components which may be included in an exemplary network server in accordance with an exemplary embodiment.
Figure 14C:
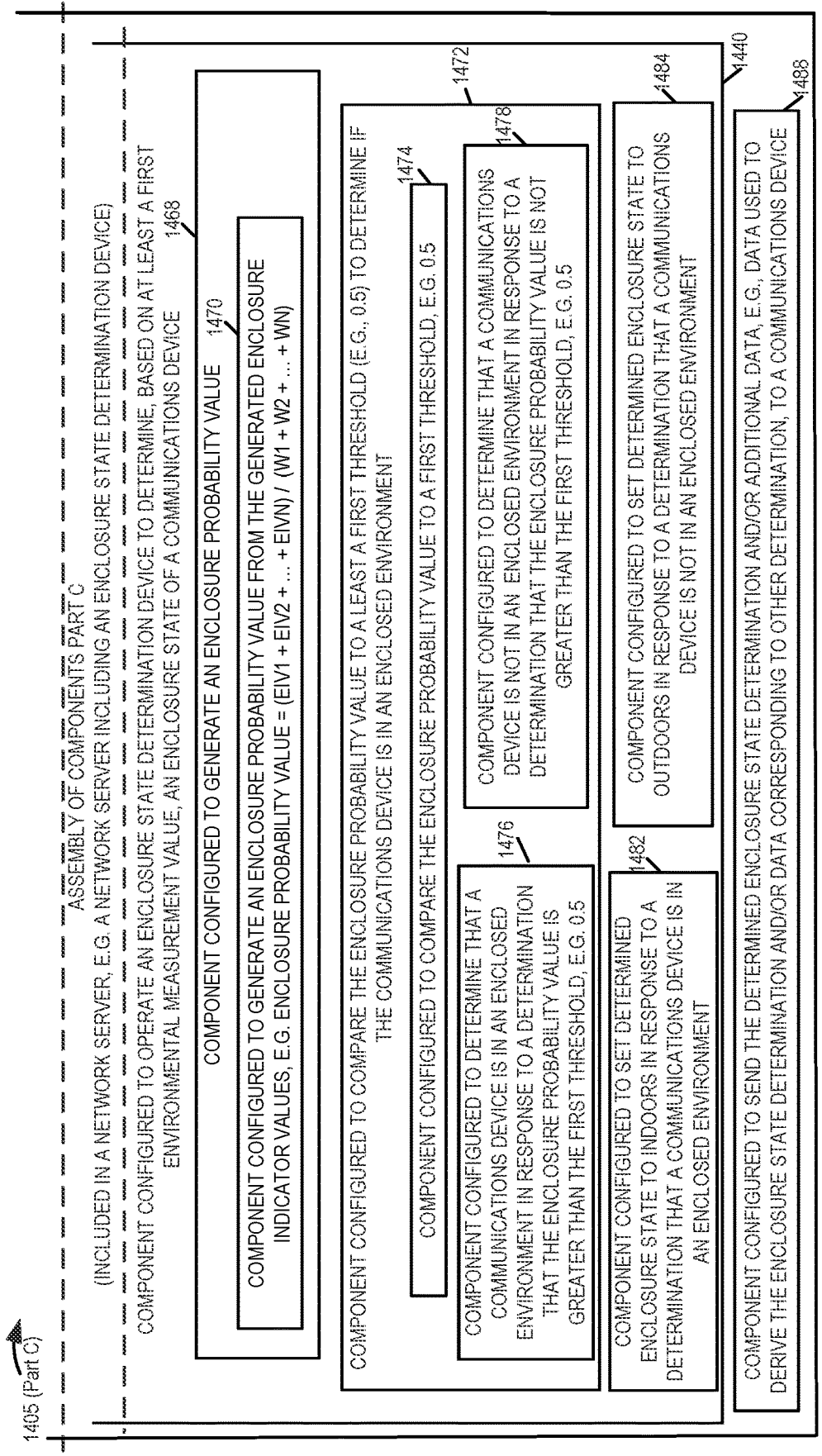
FIG. 14C is a third part of drawing of an exemplary assembly of components which may be included in an exemplary network server in accordance with an exemplary embodiment.

FIG. 14, comprising the combination of FIG. 14A, FIG. 14B and FIG. 14C, is a drawing of an assembly of components 1400, comprising the combination of Part A 1401, Part B 1403 and Part C 1405, in accordance with an exemplary embodiment. Assembly of components 1400 may be, and sometimes is, included in an exemplary network server, e.g., network server 204 of FIG. 1 and FIG. 3, a network server implementing steps of flowchart 100 of FIG. 2, network server 900 of FIG. 9 and/or a network server implementing one or more steps of a method described in the application and/or with respect to any of the Figures in the application.

The components in the assembly of components 1400 can, and in some embodiments are, implemented fully in hardware within a processor, e.g., processor 902, e.g., as individual circuits. The components in the assembly of components 1400 can, and in some embodiments are, implemented fully in hardware within the assembly of hardware components 910, e.g., as individual circuits corresponding to the different components. In other embodiments some of the components are implemented, e.g., as circuits, within processor 902 with other components being implemented, e.g., as circuits within assembly of components 910, external to and coupled to the processor 902. As should be appreciated the level of integration of components on the processor and/or with some components being external to the processor may be one of design choice. Alternatively, rather than being implemented as circuits, all or some of the components may be implemented in software and stored in the memory 912 of the network server 900, with the components controlling operation of network server 900 to implement the functions corresponding to the components when the components are executed by a processor e.g., processor 902. In some such embodiments, the assembly of components 1400 is included in the memory 1412 as part of assembly of software components 922 and/or enclosure state determination routine 923. In some embodiments, the enclosure state determination routine 923 is included as part of assembly of software components 922. In still other embodiments, various components in assembly of components 1400 are implemented as a combination of hardware and software, e.g., with another circuit external to the processor providing input to the processor which then under software control operates to perform a portion of a component's function.

When implemented in software the components include code, which when executed by a processor, e.g., processor 902, configure the processor to implement the function corresponding to the component. In embodiments where the assembly of components 1400 is stored in the memory 912, the memory 912 is a computer program product comprising a computer readable medium comprising code, e.g., individual code for each component, for causing at least one computer, e.g., processor 902, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 14 control and/or configure the network server 900 or elements therein such as the processor 902, to perform the functions of corresponding steps illustrated and/or described in the method of one or more of the flowcharts, signaling diagrams and/or described with respect to any of the Figures. Thus, the assembly of components 1400 includes various components that perform functions of corresponding one or more described and/or illustrated steps of an exemplary method, e.g., steps of the method of flowchart 100 of FIG. 2 and/or steps of the method of signaling diagram 200 of FIG. 3.

Assembly of components 1400 includes a component 1409 configured to receive a request from a communications device, e.g., a request from a UE device for an enclosure state determination of the UE device or a request for information used to derive and enclosure state determination of the UE device. In some embodiments, the request from the communications device includes location information, e.g., a UE determined geographic location of the communications device and/or information the may be used to derive a geographic location of the UE.

Assembly of components 1400 includes, in some embodiments, a component 1416 configured to determine the geographic location of a communications device. Component 1416 includes one or more or all of: a component 1418 configured to determine the location of a communications device based on received GPS signals, a component 1420 configured to determine the location of a communications device based on user input, a component 1422 configured to determine the location of a communications device based on received RF signals and triangulation, and a component 1424 configured to determine the location of a communications device based on RF signals and cellular coverage areas. In some embodiments, component 1416 is further configured to use inertial measurement unit (IMU) information, communicated from the communications device to the server, to determine the geographic information of the communications device, e.g., when GPS data is unavailable or as an aid to obtain a more accurate position when GPS data, e.g., low quality GPS data is available.

Assembly of components 1400 includes a component 1411 configured to determine a set of environmental parameters to be measured by a communications device, e.g. in response to a received request from a communications device including environmental sensors for enclosure state information and/or an enclosure state determination, a component configured to send the determined set of environmental parameters, e.g. a selected set of relevant environmental parameters, to the communications device, a component 1415 configured to receive a set of environmental parameter measurements from a communications device, a components 1417 configured to send a request for expected environmental outdoor conditions, e.g. corresponding a determined location of a communications device, a time of year, e.g., particular day of the year, a particular time of the day and/or other special conditions, e.g. to a weather server, and a component 1421 configured to receive a set of expected outdoor environmental conditions from a server, e.g., a weather server, e.g., in response to the request.

Assembly of components 1400 further includes a component 1426 configured to determine one or more expected outdoor environmental conditions corresponding to the determined location of a communications device. In some embodiments, component 1426 includes one or more or all of: a component 1428 configured to determine an expected outdoor temperature, e.g., at a particular time of a particular day for the determined location, a component 1430 configured to determine an expected outdoor wind speed and/or range of expected outdoor wind speeds and/or expected outdoor peak wind speed, at a particular time of a particular day for the determined location, a component 1432 configured to determine an expected outdoor luminosity, e.g. at a particular time of a particular day with particular expected cloud conditions for the determined location, a component 1435 configured to determine an expected outdoor atmospheric pressure, e.g. at a particular time of a particular day for the determined location, and a component 1436 configured to determine an expected outdoor audio level and/or an expected outdoor audio profile, e.g. at a particular time of a particular day for the determined location. In some embodiments, component 1426 includes components 1417 and 1421.

Assembly of components 1400 further includes a component 1440 configured to operate an enclosure state determination device, e.g., a processor 902 in the network server 900, to determine based on at least a first environmental measurement value, an enclosure state of a communications device. Component 1440 includes a component 1442 configured to generate a first enclosure indicator value (EIV1) from a first environmental measurement value (M1), e.g., an average temperature measurement, a determined first outdoor condition (OC1), e.g., an expected outdoor temperature, and a first weight (W1) corresponding to the first environmental measurement, said first weight being a function of at least one of: i) geographic location, ii) time of day, or iii) a predicted weather condition; a component 1444 configured to generate a second enclosure indicator value (EIV2) from a second environmental measurement value (M2), e.g., an average wind speed measurement, a determined second outdoor condition (OC2), e.g., an expected outdoor wind speed, and a second weight (W2) corresponding to the second environmental measurement, said first weight being a function of at least one of: i) geographic location, ii) time of day, or iii) a predicted weather condition; and a component 1446 configured to generate an Nth enclosure indicator value (EIVN) from an Nth environmental measurement value (MN), a determined Nth outdoor condition (OCN), and an Nth weight (WN) corresponding to the Nth environmental measurement, said Nth weight being a function of at least one of: i) geographic location, ii) time of day, or iii) a predicted weather condition.

Component 1442 includes a component 1448 configured to determine a difference (D1) between the first environmental measurement value (M1) and the determined first expected outdoor condition (OC1), a component 1450 configured to determine a first probability (P1) that the communications device is indoors based on the determined difference, e.g., P1=function1 (D1), and a component 1452 configured to generate the first enclosure indicator value (EIV1) based on the determined first probability (P1) and the first weight W1, e.g., EIV1=(W1)(P1). Component 1444 includes a component 1454 configured to determine a difference (D2) between the second environmental measurement value (M2) and the determined second expected outdoor condition (OC2), a component 1456 configured to determine a second probability (P2) that the communications device is indoors based on the determined difference, e.g., P2=function2 (D2), and a component 1358 configured to generate the second enclosure indicator value (EIV2) based on the determined second probability (P2) and the second weight W2, e.g., EIV2=(W2)(P2). Component 1446 includes a component 1360 configured to determine a difference (DN) between the Nth environmental measurement value (MN) and the determined Nth expected outdoor condition (OCN), a component 1462 configured to determine an Nth probability (PN) that the communications device is indoors based on the determined difference, e.g., PN=functionN (DN), and a component 1464 configured to generate the Nth enclosure indicator value (EIVN) based on the determined second probability (PN) and the second weight WN, e.g., EIVN=(WN)(PN).

Component 1440 further includes a component 1468 configured to generate an enclosure probability value. Component 1468 includes a component 1470 configured to generate an enclosure probability value from the generated enclosure indicator values, e.g., the enclosure probability value=(EIV1+EIV2+ . . . +EIVN)/(W1+W2+ . . . +WN).

Component 1440 further includes a component 1472 configured to compare the enclosure probability value to a least a first threshold, e.g., 0.5, to determine if a communications device is in an enclosed environment. Component 1472 includes a component 1474 configured to compare the enclosure probability value to a first threshold, e.g. 0.5, a component 1476 configured to determine that a communications device is in an enclosed environment in response to a determination that the enclosure probability value is greater than the first threshold, and a component 1478 configured to determine that a communications device is not in an enclosed environment in response to a determination that the enclosure probability value is not greater than the first threshold.

Component 1440 further includes a component 1482 configured to set the determined enclosure state to indoors in response to a determination that a communications device is in an enclosed environment, and a component 1484 configured to set the determined enclosure state to outdoors in response to a determination that a communications device is not in an enclosed environment.

Assembly of components 1400 further includes a component 1488 configured to send the determined enclosure state determination and/or additional data, e.g. data used to derive the enclosure state determination, data indicating a measure of the quality or certitude of the determination and/or data corresponding to other determinations, e.g. a determination as to whether or not a determined enclosed communications device is in an indoor area that is currently lit or is currently in darkness, a determination as to whether or not a determined enclosed communications device is in an indoor area that is currently powered or is currently without power, etc., to a communications device, e.g., in response to a request for a communications device enclosure state determination.

Various features and/or aspects of some, but not necessarily all, embodiments of the present invention are discussed below. An end user device is capable of measuring and reporting various environmental parameters. These measured and/or reported environmental parameters can be, and sometimes are, processed and relayed back as a composite score, which will convey the enclosure state of the end user device.

An exemplary method, in accordance with some embodiments, enables an end user device to report back various environmental parameters to a central processing server. The example method on the server will then calculate a composite score considering the various reported parameters and their corresponding weights. The composite score will then be sent back to the end user device. The example method on the end user will decide the enclosure state of the device based on the received composite score.

The example method on the server will continually gather environmental conditions from various sources. The example method will work with parameters like Temperature, Air Pressure, Wind Speed, Brightness, Noise levels etc. The example method on the server will continually modify and maintain weights associated with each parameter associated with location and time. The example method will continually learn and adjust the composite score threshold and the weights and learn to fine tune the decision-making ability.

The example method in the server will store the composite score in a cache to avoid calculating the score continuously. The example method on the server will, in some embodiments, indicate to the device when it requires new parameter reporting and a recalculation of the composite score. This indication will be based on a periodic timer check, mobility reported by the device or a forced attempt from either the server or the end user device. In case of the periodic recalculation, the periodicity can be, and sometimes is, determined and modified by the server element based on decisions made by the server element. If the example method on the server identifies or perceives a fast rate of change in the environmental parameters, it may, and sometimes does, decrease the periodic score check and in case the environmental parameters are fairly steady, it may, and sometimes does, increase the periodic score check. The periodicity may also be, and sometimes is, changed manually based on policies and decisions made by the end user or the service provider. The periodicity may also be, and sometimes is, changed based on other factors like time of day, day of week, special occasions and/or instances involving drastic changes on the parameters such as storms, eclipses, sudden unexpected weather events etc.

Determination of enclosure state will be described. This is a determination of whether the end user device is indoors or outdoors. The determination can be, and sometimes is used to help set policies and procedures, e.g., based on the determination if the user is indoors or outdoors.

Parameters used in the enclosure determination include: i) Temperature delta between the outdoor temperature from a legitimate source and the temperature measured by the device; ii) Air Pressure delta between the outdoor temperature from a legitimate source and the temperature measured by the device; iii) Air velocity delta between the outdoor temperature from a legitimate source and the temperature measured by the device, iv) Brightness between the outdoor temperature from a legitimate source and the temperature measured by the device, v) Noise Level observed by the device, vi) velocity recorded by the device.

Weights are determined based on the location and time when the exemplary methods are calculating the composite score.

From a location standpoint, the temperature delta between outdoors and indoors may be significant in Arizona for example as opposed to California. So, in this case the temperature delta will carry a bigger weight for AZ as opposed to CA.

From a time standpoint (e.g. time of the year), once again picking the temperature delta as an example, the temperature delta may be more relevant in summers and winters as opposed to fall or spring when the temperature delta may be less relevant. Once again this will depend on the current temperature as sourced from a reliable source for a particular location.

Composite scoring will be calculated considering the parameters and their associated weights per location per time. This score will then be compared against the threshold values set for such a location and this will enable the end user device to recognize whether they are indoors or outdoors.

A learning and fine tuning of the weights and thresholds process is performed. This process will help train the methods to gather the correct weights and threshold values for every location based on historic data and training process that will be employed prior to commercial deployment.

The methods running on the server component will help with caching the scores for easy access and to enable retaining the score without burdening the end user device to have identify (ID), measure and send across the parameter values continuously. The server component can request a recalculation of the score by requesting the end user device to send back new measurements based on the following conditions:

1.) Periodic check: The server may request for new measurements periodically based on the periodicity set in the server program.
2.) Mobility reported by the end user device: If the end user device detects mobility and reports back that the mobility recorded is more than a threshold value then the server may request new measurements and recalculate the score.
3. Forced request: Server program may have the provision to perform a new recalculation by forcing new measurements from the end user device, this may be done by providing access to the service provider to force this process through a method defined in the server program.

The end user device can request a recalculation of the score by starting new measurements and sending this to the server with a request for a new recalculated score based on the following conditions:

1) Forced request: End user device and by extension the end user may have the provision to request a new recalculation by forcing new measurements.
2) Flag based: End user device could Initiate this process to recovered error conditions.

Various features and/or aspects of some embodiments, but not necessarily all embodiments, of the present invention are discussed below.

A user equipment (UE) device or another device, uses determined enclosure state information to take one or more actions. Exemplary cases, in which determined enclosure state can be and sometimes is, advantageously used, in accordance with the present invention, include: i) battery usage policy cases; ii) service availability cases; iii) enhanced location estimation cases; and iv) navigation application cases.

Battery usage policies can be, and sometimes are, adjusted and set based on the following elements: i) frequency of network searches; and ii) selection of streaming quality, etc., and these elements (i) frequency of network searches; and ii) selection of streaming quality) can be, and sometimes are, set, in accordance with a feature of the present invention, based on whether someone is in-building, e.g., with low mobility and charging availability, or is outdoors in which mobility may be high and there may be no charging availability. Thus, the UE can be controlled to conserve battery power when determined to be outdoors (e.g., controlled for less frequent searches and for lower streaming quality) and may be allowed to use higher levels of battery power while indoors (e.g., more frequent searches and higher streaming quality), where battery charging capability is expected to be available.

Service availability can be, and sometimes is, determined by understanding the enclosure state, meaning if the user is inside a building, home, shop, tent or outside of it. For example, network service availability for a UE can be determined based on the enclosure determination of the UE. For example, some network services or communications networks, e.g., a WiFi or Bluetooth or other short range communications network, may be available inside a building but not available outside, so those service may be searched for or offered, and/or used while the UE is inside but not while the UE is outside. Special offering and/or directed advertisements may be sent to a UE as a function of whether or not the user is inside or outside, e.g., is the user within a store.

Enhanced location estimation can be achieved, using enclosure determination, to aid in emergency services and/or location based services.

Navigation Apps, as a subset of location based services, can be controlled to switch between in-building and outdoor navigation maps based on the enclosure state determination. Thus, enclosure state determination can be, and in some embodiments is, used as input to control switching between maps or sets of maps.

Various aspects related to environmental parameters and corresponding weights will now be described. Taking an example of temperature as a parameter, the weights will depend on time of the year and also location. The weights would directly determine how pronounced a differential would be between the temperature experience inside an enclosed space versus outside. For example, in a place like Phoenix, Arizona which is very hot in the summer a high weightage is used for the temperature parameter during the Summer months since at that location at that time of year, the expected differential between indoors and outdoor temperatures is expected to be large. (See exemplary weighting table 702 of FIG. 8.) Similarly, for example in a place like Buffalo, NY which is very cold in the winter a high weightage is used for the temperature parameter during the winter months since at that location at that time of year, the expected differential between indoors and outdoor temperatures is also expected to be large. (See exemplary weighting table 704 of FIG. 8.) In a case of a place like San Diego, California where the temperature differential between outdoor and indoor temperature is not expected to provide a lot of insight, since the weather at that location is usually moderate and the outdoor temperature typically is very close to the indoor temperature, the weighting values for temperature are relatively low year round. (See exemplary weighting table 706 of FIG. 8.)

Another parameter such as humidity may, and sometimes does, play a more weighted role in San Diego, California as opposed to Phoenix, Arizona, for example.

Another parameter to consider is luminosity, which in the case of a summer afternoon will have a higher weightage as opposed to weightage for a winter evening in a place like Phoenix, for example. Thus, luminosity is, e.g., used as a heavily weighted parameter in Phoenix during some times of the year in combination with specific times of the day in a place such as Phoenix Arizona. However, luminosity is not well suited to be used, with heavy weights, in cloudy places like the city of Seattle.

Weights and other details are, in some embodiments, are learned by an exemplary method, and may be, and sometimes are augmented with inputs from a service provider as well. (For example, see exemplary learning method of flowchart 600 of FIG. 7.)

Numbered embodiments in the following lists refer to numbered embodiments included in the same list of exemplary embodiments, e.g., a third exemplary numbered embodiment may refer to the second exemplary numbered embodiment included in the same list.

First Numbered List of Exemplary Method Embodiments

Method Embodiment 1. A method of controlling a communications device (e.g., UE) (202), the method comprising: measuring (104 or 236), at the communications device, one or more environmental conditions (e.g., temperature, wind speed, luminosity, humidity, atmospheric pressure, sound level, etc.), said step of measuring one or more environmental conditions including measuring at least a first environmental condition to determine a first environmental measurement value; operating an enclosure state determination device (e.g., processor in the UE or processor in a separate state determination device) to determine (140 or 253), based on at least the first environmental measurement value, an enclosure state of the communications device; and performing (186 or 274, 276, 282, 289, 290), at the communications device, one or more actions based on the determined enclosure state, said one or more actions including at least one of: i) using the determined enclosure state to control one or more communications device transmit or receive settings (e.g., transmit power level, monitoring for signal intervals, which of a plurality of wireless interfaces are powered on or off at a given time, e.g., power off Bluetooth or other short range communications when outdoors); ii) communicating the determined enclosure state to an emergency responder (e.g., first responder in the case of a 911 emergency call so the responder knows whether the caller is insider or outside and possibly covered by building material to facilitate finding the caller); or iii) controlling an application being used by the communications device.

Method Embodiment 1A. The method of Method Embodiment 1, wherein said step of measuring (104 or 236) one or more environmental conditions includes measuring one of: i) temperature over a period of time (106), ii) wind speed over the period of time (108), iii) luminosity (light to which UE device is exposed) over a period of the period time (110), iv) humidity over a period of time (112), or v) audio sound level over a period of time.

Method Embodiment IAA. The method of Method Embodiment 1A, wherein said first environmental measurement value is an average environmental measurement value.

Method Embodiment 1B. The method of Method Embodiment 1A wherein said step of measuring (104) one or more environmental conditions includes: measuring (106) an average temperature.

Method embodiment 1C. The method of method embodiment 1, further comprising: measuring (117), at the communications device, device motion, said measuring device motion producing determined motion information including one, more than one or all of: i) speed of motion, ii) direction of motion or iii) duration of a period of motion; and wherein performing (186), at the communications device, one or more actions based on the determined enclosure state, includes using determined motion information along with the enclosure state information to: i) control one or more communications device transmit or receive settings (e.g., periodicity or rate at which measurement of environmental conditions are performed and communicated to the enclosure state determination device), ii) communicating the motion information along with the determined enclosure state to an emergency responder (e.g., first responder in the case of a 911 emergency call so the responder knows whether the caller is insider or outside and possibly covered by building material to facilitate finding the caller); or iii) controlling an application being used by the communications device based on both the determined enclosure state and determined motion information.

Method Embodiment 2. The method of Method Embodiment 1, further comprising: determining (116 or 220) (in the communications device or at the server) the geographic location of the communications device (e.g., from a GPS receiver, user input or RF signal triangulation); and determining (126 or 241) (in the communications device or at the server) one or more expected outdoor environmental conditions (e.g., expected outdoor temperature at a given time of day; expected wind speed at a given time of day, expected outdoor luminosity (bright daylight or low light or dark night due to clouds and/or current moon phase and/or time of day)); wherein determining (140 or 253) (e.g., in the communications device or at a server to which the measurement information is communicated), based on at least the first environmental measurement value, an enclosure state of the communications device includes: generating (142 or 256) a first enclosure indicator value (EIV1) from the first environmental measurement value (M1), the determined first expected outdoor environment condition (OC1), and a first weight (W1) corresponding to the first environmental measurement value, said first weight being a function of at least one of: i) geographic location; ii) time of day or iii) a predicted weather condition.

Method Embodiment 2A. The method of Method Embodiment 2, wherein generating (142 or 256) a first enclosure indicator value includes: determining (148 or 258) a difference between (D1) between the first environmental measurement value (M1) and the determined first expected outdoor condition (OC1); determining (150 or 260) a first probability (P1) that the communications device is indoors based on the determined difference (D1) (e.g., P1=f1(D1)); and generating (152 or 262) the first enclosure indicator value (EIV1) based on the determined first probability (P1) and the first weight (W1) (e.g., EIV1=(W1)(P1)).

Method Embodiment 2B. The method of Method Embodiment 2A, wherein determining (140 or 253) (e.g., in the communications device or at a server to which the measurement information is communicated), based on at least the first environmental measurement value, an enclosure state of the communications device further includes: generating (144 or 256) a second enclosure indicator value (EIV2) from a second environmental measurement value (M2), a determined second expected outdoor environment condition (OC2), and a second weight (W2) corresponding to the second environmental measurement value, said second weight being a function of at least one of: i) geographic location; ii) time of day or iii) a predicted weather condition.

Method Embodiment 2C. The method of Method Embodiment 2B, wherein generating (144 or 256) a second enclosure indicator value includes: determining a difference between (D2) between the second environmental measurement value (M2) and the determined second expected outdoor condition (OC2); determining a second probability (P2) that the communications device is indoors based on the determined difference (D2) (e.g., P2=f2(D2)); and generating the second enclosure indicator value (EIV2) based on the determined second probability (P2) and the second weight (W2) (e.g., EIV2=(W1)(P2)).

Method Embodiment 3. The method of Method Embodiment 2, wherein determining (140 or 253) the enclosure state of the communications device further includes: generating (170 or 264) an enclosure probability value from one or more generated enclosure indicator values, said one of more enclosure indicator values including said first enclosure indicator value (e.g., enclosure probability value=(EIV1+EIV2+ . . . +EIVN)/(W1+W2+ . . . +WN), where there are N different environmental parameters being used in the determination).

Method Embodiment 4. The method of Method Embodiment 3, wherein determining (140 or 253) the enclosure state of the communications device further includes: comparing (172 or 266) the enclosure probability value to at least a first threshold (e.g., 0.5) to determine if the communications device is in an enclosed environment (e.g., indoor or outdoor environment, e.g., if the value is 0.5 or above the device is determined (182) to be indoors, but if it is below 0.5 then the device is determined (184) to be outdoors).

Method Embodiment 4A. The method of Method Embodiment 4, wherein the enclosure probability value is a composite score (e.g., composite score is an integer value in the range of 0-MAXINTEGER (E.G., 0-100), and first threshold is a selected transition point within the range (e.g., range midpoint=50), where composite scores above first threshold indicate indoors and composite scores below first threshold indicate outdoors).

Method Embodiment 4B. The method of Method Embodiment 4A, wherein the composite score is determined from: i) a selected set of environmental measurements (e.g., average measured temp, average measured humidity, . . . , and/or average measured luminosity) ii) a set of expected outdoor conditions corresponding to the selected set of input environmental measurements (expected outdoor temp from weather server for location of UE, expected outdoor humidity from weather server for location of UE, . . . , and/or expected outdoor luminosity for location of UE based on cloud cover conditions and time of day), and iii) a set of weight values (weight value for temp based on location and day and/or month and/or time of day (TOD), weight value for humidity based on location and day and/or month and/or TOD, . . . , and/or weight value for luminosity based on location and day and/or month and/or TOD) corresponding to the selected set environmental measurements (e.g., composite score=function (environmental measurement 1, . . . environmental measurement N, expected outdoor condition 1, . . . , expected outdoor condition N, weight 1, . . . , weight N)).

Method Embodiment 5. The method of Method Embodiment 1, wherein controlling one or more communications device transmit or receive settings includes: changing the frequency of network searches in response to a determined change in enclosure state, said frequency of network searches being higher when enclosure state indicates enclosed (indoors) than when enclosure state indicated not enclosed (outdoors).

Method Embodiment 6. The method of Method Embodiment 1, wherein controlling one or more communications device transmit or receive settings includes: changing the streaming quality in response to a determined change in enclose state, wherein streaming quality is set at a higher rate when enclosure state indicates enclosed (indoors) than when enclosure state indicates not enclosed (outdoors).

Method Embodiment 7. The method of Method Embodiment 1, wherein controlling one or more communications device transmit or receive settings includes: activating or de-activating one or more interfaces (e.g., short range interface such as WiFi interface, Bluetooth interface, Bluetooth Low Energy (BLE) interface, etc.) in response to a determined change in enclosure state, wherein one or more short range interfaces are active when the enclosure state indicates enclosed (indoors) and are de-activated when the enclosure state indicates not enclosed (outdoors).

Method Embodiment 7A. The method of Method Embodiment 1, wherein controlling one or more communications device transmit or receive settings includes: activating or de-activating one or more interfaces (e.g., long range interfaces such as a Narrow Band Internet-of-Things (NB IoT) interface, a Long Range Wide Area Network (LoRa WAN) interface, a Low Power Long Range Wide Area Network (LP LoRa WAN) interface, etc.) in response to a determined change in enclosure state, wherein one or more long range interfaces are de-activated when the enclosure state indicates enclosed (indoors) and are activated when the enclosure state indicates not enclosed (outdoors).

Method Embodiment 8. The method of Method Embodiment 1, wherein controlling an application being used by the communications device includes: switching maps displayed by an application (e.g., navigation application) between indoor maps (interior building maps, e.g. floorplan maps such as a museum floorplan map or a office building maps identifying individual offices within a building with particular companies renting office space or individuals in offices or cubicles) to outside maps (e.g. street maps) in response to a determined change in enclosure state.

Method Embodiment 9. The method of Method Embodiment 1, wherein controlling an application being used by the communications device includes: controlling a targeted marketing application based on determined enclosure state (displaying marketing advertisement corresponding to a store when the determined enclosure state indicates enclosed (e.g., in a store or in an enclosed mall) while refraining from displaying the marketing advertisement when the determined enclosure state indicates not enclosed (outdoors)).

First Numbered List of Exemplary System Embodiments

System Embodiment 1. A communications system (10) comprising: a communications device (e.g., UE 202 or communications device 800) including: one or more environmental sensors (e.g., temperature sensor 861, barometer 862, humidity sensor 863, light sensor 864, wind speed sensor 865, audio sensor 866); and a first processor (802) configured to: operate the communications device to measure (104 or 236), at the communications device, one or more environmental conditions (e.g., temperature, wind speed, luminosity, humidity, atmospheric pressure, sound level, etc.), said step of measuring one or more environmental conditions including measuring at least a first environmental condition to determine a first environmental measurement value; operate the communications device to perform (186 or 274, 276, 282, 289, 290), at the communications device, one or more actions based on a determined enclosure state, said one or more actions including at least one of: i) using the determined enclosure state to control one or more communications device transmit or receive settings (e.g., transmit power level, monitoring for signal intervals, which of a plurality of wireless interfaces are powered on or off at a given time, e.g., power off Bluetooth or other short range communications when outdoors); ii) communicating the determined enclosure state to an emergency responder (e.g., first responder in the case of a 911 emergency call so the responder knows whether the caller is insider or outside and possibly covered by building material to facilitate finding the caller); or iii) controlling an application being used by the communications device.

System Embodiment 1a. The communications system of System Embodiment 1, wherein said first processor is an enclosure state determination device, and wherein said first processor is further configured to: operate the enclosure state determination device to determine (140 or 253), based on at least the first environmental measurement value, an enclosure state of the communications device.

System Embodiment 1b. The communications system of System Embodiment 1, wherein said communication device further includes: an enclosure state determination device (e.g., component 810, e.g. a second processor and/or circuitry within communications device 800) configured to determine (140 or 253), based on at least the first environmental measurement value, an enclosure state of the communications device.

System Embodiment 1c. The communications system of System Embodiment 1, further comprising: a server (network server 204 or server 900) including: an enclosure state determination device (e.g., device 206 or processor 902) configured to determine (140 or 253), based on at least the first environmental measurement value, an enclosure state of the communications device.

System Embodiment 1A. The communications system of any or System Embodiments 1a, 1b, or 1c, wherein said step of measuring (104 or 236) one or more environmental conditions includes measuring one of: i) temperature over a period of time (106), ii) wind speed over the period of time (108), iii) luminosity (light to which UE device is exposed) over a period of the period time (110), iv) humidity over a period of time (112), or v) audio sound level over a period of time.

System Embodiment IAA. The communications system of System Embodiment 1A, wherein said first environmental measurement value is an average environmental measurement value.

System Embodiment 1B. The communications system of System Embodiment 1A wherein said step of measuring (104) one or more environmental conditions includes: measuring (106) an average temperature.

System Embodiment 1C. The communications system of System Embodiment 1, wherein said first processor is further configured to: operate (117) the communications device to measure, device motion, said measuring device motion producing determined motion information including one, more than one or all of: i) speed of motion, ii) direction of motion or iii) duration of a period of motion; and wherein performing (186), at the communications device, one or more actions based on the determined enclosure state, includes using determined motion information along with the enclosure state information to: i) control one or more communications device transmit or receive settings (e.g., periodicity or rate at which measurement of environmental conditions are performed and communicated to the enclosure state determination device, ii) communicating the motion information along with the determined enclosure state to an emergency responder (e.g., first responder in the case of a 911 emergency call so the responder knows whether the caller is insider or outside and possibly covered by building material to facilitate finding the caller); or iii) controlling an application being used by the communications device based on both the determined enclosure state and determined motion information.

System Embodiment 2. The communications system of any of System Embodiments 1a, 1b or 1c, wherein, said first processor or said enclosure state determination device is further configured to: determine (116 or 220) (in the communications device or at the server) the geographic location of the communications device (e.g., from a GPS receiver, user input or RF signal triangulation); and wherein, said enclosure state determination device is further configured to: determine (126 or 241) (in the communications device or at the server) one or more expected outdoor environmental conditions (e.g., expected outdoor temperature at a given time of day; expected wind speed at a given time of day, expected outdoor luminosity (bright daylight or low light or dark night due to clouds and/or current moon phase and/or time of day)); wherein said enclosure state determination device is configured to: generate (142 or 256) a first enclosure indicator value (EIV1) from the first environmental measurement value (M1), the determined first expected outdoor environment condition (OC1), and a first weight (W1) corresponding to the first environmental measurement value, said first weight being a function of at least one of: i) geographic location; ii) time of day or iii) a predicted weather condition, as part of being configured to determine (140 or 253) (e.g., in the communications device or at a server to which the measurement information is communicated), based on at least the first environmental measurement value an enclosure state of the communications device.

System Embodiment 2A. The communications system of System Embodiment 2, wherein said enclosure state determination device is configured to: determine (148 or 258) a difference between (D1) between the first environmental measurement value (M1) and the determined first expected outdoor condition (OC1); determine (150 or 260) a first probability (P1) that the communications device is indoors based on the determined difference (D1) (e.g., P1=f1(D1)); and generate (152 or 262) the first enclosure indicator value (EIV1) based on the determined first probability (P1) and the first weight (W1) (e.g., EIV1=(W1)(P1)), as part of being configured to generate (142 or 256) a first enclosure indicator value.

System Embodiment 2B. The communications system of System Embodiment 2A, wherein said enclosure state determination device is configured to: generate (144 or 256) a second enclosure indicator value (EIV2) from a second environmental measurement value (M2), a determined second expected outdoor environment condition (OC2), and a second weight (W2) corresponding to the second environmental measurement value, said second weight being a function of at least one of: i) geographic location; ii) time of day or iii) a predicted weather condition, as part of being configured to determine (140 or 253) (e.g., in the communications device or at a server to which the measurement information is communicated), based on at least the first environmental measurement value an enclosure state of the communications device.

System Embodiment 2C. The communications system of System Embodiment 2B, wherein said enclosure state determination device is configured to: determine a difference between (D2) between the second environmental measurement value (M2) and the determined second expected outdoor condition (OC2); determine a second probability (P2) that the communications device is indoors based on the determined difference (D2) (e.g., P2=f2(D2)); and generate the second enclosure indicator value (EIV2) based on the determined second probability (P2) and the second weight (W2) (e.g., EIV2=(W1)(P2)), as part of being configured to generate (144 or 256) an second enclosure indicator value.

System Embodiment 3. The communications system of System Embodiment 2, wherein said enclosure state determination device is configured to: generate (170 or 264) an enclosure probability value from one or more generated enclosure indicator values, said one of more enclosure indicator values including said first enclosure indicator value (e.g., enclosure probability value=(EIV1+EIV2+ . . . +EIVN)/(W1+W2+ . . . +WN), where there are N different environmental parameters being used in the determination), as part of being configured to determine (140 or 253) the enclosure state of the communications device.

System Embodiment 4. The communications system of System Embodiment 3, wherein said enclosure state determination device is configured to: compare (172 or 266) the enclosure probability value to at least a first threshold (e.g., 0.5) to determine if the communications device is in an enclosed environment (e.g., indoor or outdoor environment, e.g., if the value is 0.5 or above the device is determined (182) to be indoors, but if it is below 0.5 then the device is determined (184) to be outdoors), as part of being configured to determine (140 or 253) the enclosure state of the communications device.

System Embodiment 4A. The communications system of System Embodiment 4, wherein the enclosure probability value is a composite score (e.g., composite score is an integer value in the range of 0-MAXINTEGER (E.G., 0-100), and first threshold is a selected transition point within the range (e.g., range midpoint=50), where composite scores above first threshold indicate indoors and composite scores below first threshold indicate outdoors).

System Embodiment 4B. The communications system of System Embodiment 4A, wherein the composite score is determined from: i) a selected set of environmental measurements (e.g., average measured temp, average measured humidity, . . . , and/or average measured luminosity) ii) a set of expected outdoor conditions corresponding to the selected set of input environmental measurements (expected outdoor temp from weather server for location of UE, expected outdoor humidity from weather server for location of UE, . . . , and/or expected outdoor luminosity for location of UE based on cloud cover conditions and time of day), and iii) a set of weight values (weight value for temp based on location and day and/or month and/or time of day (TOD), weight value for humidity based on location and day and/or month and/or TOD, . . . , and/or weight value for luminosity based on location and day and/or month and/or TOD) corresponding to the selected set environmental measurements (e.g., composite score=function (environmental measurement 1, . . . environmental measurement N, expected outdoor condition 1, . . . , expected outdoor condition N, weight 1, . . . , weight N)).

System Embodiment 5. The communications system of System Embodiment 1, wherein said first processor is configured to: change the frequency of network searches in response to a determined change in enclosure state, said frequency of network searches being higher when enclosure state indicates enclosed (indoors) than when enclosure state indicated not enclosed (outdoors), as part of being configured to control one or more communications device transmit or receive settings.

System Embodiment 6. The communications system of System Embodiment 1, wherein said first processor is configured to: change the streaming quality in response to a determined change in enclosure state, wherein streaming quality is set at a higher rate when enclosure state indicates enclosed (indoors) than when enclosure state indicates not enclosed (outdoors), as part of being configured to control one or more communications device transmit or receive settings.

System Embodiment 7. The communications system of System Embodiment 1, wherein said first processor is configured to: activate or de-activate one or more interfaces (e.g., short range interface such as WiFi interface, Bluetooth interface, Bluetooth Low Energy (BLE) interface, etc.) in response to a determined change in enclosure state, wherein one or more short range interfaces are active when the enclosure state indicates enclosed (indoors) and are de-activated when the enclosure state indicates not enclosed (outdoors), as part of being configured to control one or more communications device transmit or receive settings.

System Embodiment 7A. The communications system of System Embodiment 1, wherein said first processor is configured to: activate or de-activate one or more interfaces (e.g., long range interfaces such as a Narrow Band Internet-of-Things (NB IoT) interface, a Long Range Wide Area Network (LoRa WAN) interface, a Low Power Long Range Wide Area Network (LP LoRa WAN) interface, etc.) in response to a determined change in enclosure state, wherein one or more long range interfaces are de-activated when the enclosure state indicates enclosed (indoors) and are activated when the enclosure state indicates not enclosed (outdoors).

System Embodiment 8. The communications system of System Embodiment 1, wherein said first processor is configured to: switch maps displayed by an application (e.g., navigation application) between indoor maps (interior building maps, e.g. floorplan maps such as a museum floorplan map or a office building maps identifying individual offices within a building with particular companies renting office space or individuals in offices or cubicles) to outside maps (e.g. street maps) in response to a determined change in enclosure state, as part of being configured to control an application being used by the communications device.

System Embodiment 9. The communications system of System Embodiment 1, wherein said first processor is configured to: control a targeted marketing application based on determined enclosure state (displaying marketing advertisement corresponding to a store when the determined enclosure state indicates enclosed (e.g., in a store or in an enclosed mall) while refraining from displaying the marketing advertisement when the determined enclosure state indicates not enclosed (outdoors)), as part of being configured to control an application being used by the communications device.

Second Numbered List of Exemplary Method Embodiments

Method Embodiment 1. A method of controlling a communications device (e.g., UE) (202), the method comprising: measuring, at the communications device, one or more environmental, said step of measuring one or more environmental conditions including measuring at least a first environmental condition to determine a first environmental measurement value; and performing, at the communications device, one or more actions based on an enclosure state determined based on at least the first environmental measurement value, said one or more actions including at least one of: i) using the determined enclosure state to control one or more communications device transmit or receive settings; ii) communicating the determined enclosure state to an emergency responder; or iii) controlling an application being used by the communications device.

Method Embodiment 2. The method of Method Embodiment 1, further comprising: measuring, at the communications device, device motion, said measuring device motion producing determined motion information including one, more than one or all of: i) speed of motion, ii) direction of motion or iii) duration of a period of motion; and wherein performing, at the communications device, one or more actions based on the enclosure state determined based on at least the first environmental measurement value, includes using determined motion information along with the enclosure state information to: i) control one or more communications device transmit or receive settings, ii) communicating the motion information along with the determined enclosure state to an emergency; or iii) controlling an application being used by the communications device based on both the determined enclosure state and determined motion information.

Method Embodiment 3. The method of Method Embodiment 1, further comprising: determining the geographic location of the communications device; and determining one or more expected outdoor environmental conditions.

Method Embodiment 4. The method of Method Embodiment 3, further comprising: determining, based on at least the first environmental measurement value, said enclosure state of the communications device, determining the enclosure state including: generating a first enclosure indicator value from the first environmental measurement value, the determined first expected outdoor environment condition, and a first weight corresponding to the first environmental measurement value, said first weight being a function of at least one of: i) geographic location; ii) time of day or iii) a predicted weather condition.

Method Embodiment 5. The method of Method Embodiment 4, wherein determining the enclosure state of the communications device further includes: generating an enclosure probability value from one or more generated enclosure indicator values, said one of more enclosure indicator values including said first enclosure indicator value.

Method Embodiment 6. The method of Method Embodiment 4, wherein determining the enclosure state based on at least the first environmental measurement value includes operating an enclosure state determination device included in said communications device or an enclosure state determination device (e.g., component 810) included in a network element (e.g., in communications with said communications device to determine the enclosure state.

Method Embodiment 7. The method of Method Embodiment 4, wherein determining the enclosure state of the communications device further includes: comparing the enclosure probability value to at least a first threshold to determine if the communications device is in an enclosed environment.

Method Embodiment 8. The method of Method Embodiment 1, wherein controlling one or more communications device transmit or receive settings includes: changing the frequency of network searches in response to a determined change in enclosure state, said frequency of network searches being higher when enclosure state indicates enclosed than when enclosure state indicated not enclosed.

Method Embodiment 9. The method of Method Embodiment 1, wherein controlling one or more communications device transmit or receive settings includes: changing the streaming quality in response to a determined change in enclose state, wherein streaming quality is set at a higher rate when enclosure state indicates enclosed than when enclosure state indicates not enclosed.

Method Embodiment 10. The method of Method Embodiment 1, wherein controlling one or more communications device transmit or receive settings includes: activating or de-activating one or more interfaces in response to a determined change in enclosure state, wherein one or more short range interfaces are active when the enclosure state indicates enclosed and are de-activated when the enclosure state indicates not enclosed.

Method Embodiment 11. The method of Method Embodiment 1, wherein controlling an application being used by the communications device includes: switching maps displayed by an application between indoor maps to outside maps in response to a determined change in enclosure state.

Method Embodiment 12. The method of Method Embodiment 1, wherein controlling an application being used by the communications device includes: controlling a targeted marketing application based on determined enclosure state.

List of Exemplary Communications Device Embodiments

Communications Device 1. A communications device comprising: one or more environmental sensors; and a first processor configured to: control the communications device to measure, at the communications device, one or more environmental conditions, said step of measuring one or more environmental conditions including measuring at least a first environmental condition to determine a first environmental measurement value; and perform, at the communications device, one or more actions based on an enclosure state determined based on at least the first environmental measurement value, said one or more actions including at least one of: i) using the determined enclosure state to control one or more communications device transmit or receive settings; ii) communicating the determined enclosure state to an emergency responder; or iii) controlling an application being used by the communications device.

Communications Device 2. The communications device of Communications Device 1, wherein the processor is further configured to control the communications device to measure, at the communications device, device motion, said measuring device motion producing determined motion information including one, more than one or all of: i) speed of motion, ii) direction of motion or iii) duration of a period of motion; and use determined motion information along with the enclosure state information to: i) control one or more communications device transmit or receive settings, ii) communicating the motion information along with the determined enclosure state to an emergency; or iii) controlling an application being used by the communications device based on both the determined enclosure state and determined motion information.

Communications Device 3. The communications device of Communications Device 1, wherein the processor is further configured to control the communications device to: determine the geographic location of the communications device; and determining one or more expected outdoor environmental conditions.

Communications Device 4. The communications device of Communications Device 15, wherein the processor is further configured to: determine, based on at least the first environmental measurement value, said enclosure state of the communications device, determining the enclosure state including: generating a first enclosure indicator value from the first environmental measurement value, the determined first expected outdoor environment condition, and a first weight corresponding to the first environmental measurement value, said first weight being a function of at least one of: i) geographic location; ii) time of day or iii) a predicted weather condition.

Communications Device 5. The communications device of Communications Device 4, wherein the processor, as part of determining the enclosure state of the communications device, is configured to: generate an enclosure probability value from one or more generated enclosure indicator values, said one of more enclosure indicator values including said first enclosure indicator value.

Communications Device 6. The communications device of Communications Device 5, wherein the processor, as part of being configured to determine the enclosure state of the communications device is configured to: compare the enclosure probability value to at least a first threshold to determine if the communications device is in an enclosed environment.

Communications Device 7. The communications device of Communications Device 1, wherein the processor as part of being configured to control one or more communications device transmit or receive settings is configured to change the frequency of network searches in response to a determined change in enclosure state, said frequency of network searches being higher when enclosure state indicates enclosed than when enclosure state indicated not enclosed.

Communications Device 8. The communications device of Communications Device 1, wherein the processor, as part of being configured to control one or more communications device transmit or receive settings, is configured to change the streaming quality in response to a determined change in enclose state, wherein streaming quality is set at a higher rate when enclosure state indicates enclosed than when enclosure state indicates not enclosed.

Communications Device 9. The communications device of Communications Device 1, wherein the processor, as part of being configured to control one or more communications device transmit or receive settings, is configured to activate or de-activate one or more interfaces in response to a determined change in enclosure state, wherein one or more short range interfaces are active when the enclosure state indicates enclosed and are de-activated when the enclosure state indicates not enclosed.

Communications Device 10. The communications device of Communications Device 1, wherein the processor, as part of being configured to control an application being used by the communications device is configured to: switch maps displayed by an application between indoor maps to outside maps in response to a determined change in enclosure state.

Numbered List of Non-Transitory Computer Readable Medium Embodiments

Non-Transitory Computer Readable Medium Embodiment 1: A non-transitory computer readable medium (812) including computer executable instructions which when executed by a processor (802) of a communications device (e.g., UE) (202 or 802) control the communications device (202 or 802) to perform the steps of: measuring (104 or 236), at the communications device, one or more environmental conditions (e.g., temperature, wind speed, luminosity, humidity, atmospheric pressure, sound level, etc.), said step of measuring one or more environmental conditions including measuring at least a first environmental condition to determine a first environmental measurement value; operating an enclosure state determination device (e.g., processor in the UE or processor in a separate state determination server) to determine (140 or 253), based on at least the first environmental measurement value, an enclosure state of the communications device; and performing (186 or 274, 276, 282, 289, 290), at the communications device, one or more actions based on the determined enclosure state, said one or more actions including at least one of: i) using the determined enclosure state to control one or more communications device transmit or receive settings (e.g., transmit power level, monitoring for signal intervals, which of a plurality of wireless interfaces are powered on or off at a given time, e.g., power off Bluetooth or other short range communications when outdoors); ii) communicating the determined enclosure state to an emergency responder (e.g., first responder in the case of a 911 emergency call so the responder knows whether the caller is insider or outside and possibly covered by building material to facilitate finding the caller); or iii) controlling an application being used by the communications device.

2. A non-transitory computer readable medium including computer executable instructions which when executed by a processor of a communications device control the communications device to perform the steps of: measuring, at the communications device, one or more environmental, said step of measuring one or more environmental conditions including measuring at least a first environmental condition to determine a first environmental measurement value; and performing, at the communications device, one or more actions based on an enclosure state determined based on at least the first environmental measurement value, said one or more actions including at least one of: i) using the determined enclosure state to control one or more communications device transmit or receive settings; ii) communicating the determined enclosure state to an emergency responder; or iii) controlling an application being used by the communications device.

In some but not necessarily all embodiments an enclosed state determination is interpreted as a device being indoors, e.g., in an enclosed environment, and a not enclosed state determination is interpreted as the device being outdoors, e.g., not being in an enclosed environment.

In some embodiments when a person or device is inside a moving vehicle or other enclosure an enclosure state determination will detect a positive enclosure state, i.e., that the user or device is in an enclosed space due to the environmental conditions within those confine of the space while if the user/device were outside in an open area the determine would be that the user/device is not in an enclosed space. In at least some embodiments motion is taken into consideration in addition to enclosure state. Whether or not a user/device is in motion can also be considered in addition to enclosure state as to which particular polices/rules are applied in controlling or taking an action. Thus, a first set of rules and/or policies may and in some cases will not apply since when a user/device is determined to be an enclosed state but in motion with a second set of rules/policies applying when being a user/device is an enclosed state but not in motion. is not stationary. Thus, if a user or device is in an environmental condition, such as enclosed in the vehicle and in a stationary state a different set of rules/polices will be applied in some cases than when a user/device is in the same condition, e.g., inside the vehicle but in motion. Thus, different rules, policies and/or actions can be, and sometimes are taken based on a combination of enclosure state and whether or not device motion is detected. Such different rules for motion/non-motion in combination with whether a device or user is an enclosed or non-enclosed environment can be applied to a wide range of applications including first responder use cases where it can be important to the first responder not only to know that a device/user is an enclosed environment but also whether the device/user is moving. This can be useful not only in locating a person to be rescued or help but can also help in assessing risk e.g., if a person is an a vehicle and movement is detected the first responder may take into consideration that the vehicle is at risk of rolling off a cliff or hill or into traffic and can act accordingly whether that be in terms of rushing assistance or taking extra care when interacting with a rolling or rocking vehicle.

Various embodiments are directed to apparatus, e.g., user devices such as a user equipment (UE) device, mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), a Spectrum Access System (SAS), an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating user devices, base stations, e.g., eNB and CBSDs, gateways, servers (HSS server), MMEs, SAS, cable networks, cloud networks, nodes, servers, cloud service servers, customer premises equipment devices, controllers, network monitoring nodes and/or servers and/or cable or network equipment devices. Various embodiments are directed to communications network which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a MVNO base station such as a CBRS base station, e.g., a CBSD, a device such as a cellular base station e.g., an eNB, a MNO HSS server, a MVNO HSS server, a UE device, a relay device, e.g. a MME, SAS, etc., said device including a processor configured to implement one, multiple or all of the steps of one or more methods of the invention.

In some embodiments, the processor or processors, e.g., CPUs, of one or more devices, e.g., communications nodes such as e.g., a MVNO base station such as a CBRS base station, e.g. a CBSD, an device such as a cellular base station e.g., an eNB, a MNO HSS server, a MVNO HSS device server, a UE device, a relay device, e.g. a MME, a SAS, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as e.g., a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., as e.g., a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a MNVO base station, e.g., a CBSD, an MNO cellular base station, e.g., an eNB or a gNB, a HSS server, a UE device, a SAS or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of controlling a communications device, the method comprising:
determining one or more expected outdoor environmental conditions, said determining one or more expected outdoor environmental conditions includes determining a first expected outdoor condition value;
determining a first difference value, said first difference value being a difference between a first environmental measurement value and the determined first expected outdoor condition value;
determining a first probability that the communications device is indoors based on the first difference value, said communications device being a UE user equipment (UE);
generating a first enclosure indicator value based on the first environmental measurement value; and
performing, at the communications device, one or more actions based on an enclosure state determined based on at least the first enclosure indicator value.

2. The method of claim 1, further comprising:
determining a geographic location at which the communications device is located; and
wherein the first expected outdoor condition value is for the determined geographic location.

3. The method of claim 1, wherein generating the first enclosure indicator value includes multiplying the first probability with a first weight corresponding to the first environmental measurement value.

4. The method of claim 3, wherein said one or more actions includes at least one of: i) using the determined enclosure state to control one or more communications device transmit or receive settings, ii) communicating the determined enclosure state to an emergency responder or iii) controlling an application being used by the communications device.

5. The method of claim 4, wherein determining the enclosure state based on at least the first enclosure indicator value includes operating an enclosure state determination device included in said communications device or an enclosure state determination device included in a network element in communications with said communications device to determine the enclosure state.

6. The method of claim 3, further comprising:
measuring, at the communications device, device motion, said measuring device motion producing determined motion information including one, more than one or all of: i) speed of motion, ii) direction of motion or iii) duration of a period of motion; and
wherein performing, at the communications device, one or more actions based on the enclosure state determined based on at least the first enclosure indicator value, includes using determined motion information along with the enclosure state information to: i) control one or more communications device transmit or receive settings, ii) communicate the motion information along with the determined enclosure state to an emergency responder or iii) control an application being used by the communications device based on both the determined enclosure state and determined motion information.

7. The method of claim 3,
wherein determining one or more expected outdoor environmental conditions expected at said geographic location further includes determining a second expected outdoor condition value, the method further comprising:
determining a second difference value, said second difference value being a difference between a second environmental measurement value and the determined second expected outdoor condition value;
determining a second probability that the UE is indoors based on the second difference value; and
generating a second enclosure indicator value by multiplying the second probability with a second weight corresponding to the second environmental measurement value; and
wherein determining the enclosure state based on at least the first enclosure indicator value includes determining the enclosure state based on both the first enclosure indicator value and the second enclosure indicator value.

8. The method of claim 3,
wherein the first environmental measurement value is a temperature measurement value;
wherein the first expected outdoor condition value is a first outdoor temperature value; and
wherein said first weight is a function of at least one of: i) geographic location, ii) time of day or iii) a predicted weather condition.

9. The method of claim 3, wherein determining the enclosure state of the communications device based on at least the first enclosure indicator value further includes:
comparing the enclosure probability value to at least a first threshold to determine if the communications device is in an enclosed environment.

10. The method of claim 3, wherein performing, at the communications device, one or more actions, based on the enclosure state determined based on at least the first enclosure indicator value, includes controlling one or more communications device transmit or receive settings, and
wherein controlling one or more communications device transmit or receive settings includes changing the frequency of network searches in response to a determined change in enclosure state, said frequency of network searches being higher when enclosure state indicates enclosed than when enclosure state indicates not enclosed.

11. The method of claim 3, wherein performing, at the communications device, one or more actions, based on the enclosure state determined based on at least the first enclosure indicator value, includes controlling one or more communications device transmit or receive settings, and
wherein controlling one or more communications device transmit or receive settings includes: activating or de-activating one or more interfaces in response to a determined change in enclosure state, wherein one or more short range interfaces are active when the enclosure state indicates enclosed and are de-activated when the enclosure state indicates not enclosed.

12. The method of claim 3, wherein performing, at the communications device, one or more actions, based on the enclosure state determined based on at least the first enclosure indicator value, includes controlling a targeted marketing application based on determined enclosure state.

13. A communications device comprising:
one or more environmental sensors; and
a first processor configured to control the communications device to:
determine one or more expected outdoor environmental conditions, said determining one or more expected outdoor environmental conditions includes determining a first expected outdoor condition value;
determine a first difference value, said first difference value being a difference between a first environmental measurement value and the determined first expected outdoor condition value;
determine a first probability that the communications device is indoors based on the first difference value, said communications device being a user equipment (UE);
generate a first enclosure indicator value based on the first environmental measurement value; and
perform, at the communications device, one or more actions based on an enclosure state determined based on at least the first enclosure indicator value.

14. The communications device of claim 13, wherein the first processor is configured to control the communications device to:
determine a geographic location at which the communications device is located; and
wherein the first expected outdoor condition value is for the determined geographic location.

15. The communications device of claim 13, wherein the first processor is configured to control the communications device, as part of generating the first enclosure indicator value, to multiply the first probability with a first weight corresponding to the first environmental measurement value.

16. The communications device of claim 15, wherein said one or more actions includes at least one of: i) using the determined enclosure state to control one or more communications device transmit or receive settings, ii) communicating the determined enclosure state to an emergency responder or iii) controlling an application being used by the communications device.

17. The communications device of claim 15, wherein the first processor is further configured to control the communications device to:
measure, at the communications device, device motion, said measuring device motion producing determined motion information including one, more than one or all of: i) speed of motion, ii) direction of motion or iii) duration of a period of motion; and
wherein performing, at the communications device, one or more actions, based on the enclosure state determined based on at least the first enclosure indicator value, includes using determined motion information along with the enclosure state information to: i) control one or more communications device transmit or receive settings, ii) communicate the motion information along with the determined enclosure state to an emergency responder or iii) control an application being used by the communications device based on both the determined enclosure state and determined motion information.

18. The communications device of claim 15, wherein the first processor is further configured to control the communications device to:
determine a second expected outdoor condition value;
determine a second difference value, said second difference value being a difference between a second environmental measurement value and the determined second expected outdoor condition value;
determine a second probability that the UE is indoors based on the second difference value;
generate a second enclosure indicator value by multiplying the second probability with a second weight corresponding to the second environmental measurement value; and
wherein as part of determining the enclosure state based on at least the first enclosure indicator value, the first processor controls the communications device to determine the enclosure state based on both the first enclosure indicator value and the second enclosure indicator value.

19. The communications device of claim 15,
wherein the first environmental measurement value is a temperature measurement value;
wherein the first expected outdoor condition value is a first outdoor temperature value; and
wherein said first weight is a function of at least one of: i) geographic location, ii) time of day or iii) a predicted weather condition.

20. A non-transitory computer readable medium including computer executable instructions which when executed by a processor of a communications device control the communications device to perform the steps of:
determining one or more expected outdoor environmental conditions, said determining one or more expected outdoor environmental conditions includes determining a first expected outdoor condition value;
determining a first difference value, said first difference value being a difference between a first environmental measurement value and the determined first expected outdoor condition value;
determining a first probability that the communications device is indoors based on the first difference value, said communications device being a user equipment (UE);
generating a first enclosure indicator value based on the first environmental measurement value; and
performing, at the communications device, one or more actions based on an enclosure state determined based on at least the first enclosure indicator value.

* * * * *